United States Patent
Thornewell et al.

(10) Patent No.: US 11,457,095 B1
(45) Date of Patent: *Sep. 27, 2022

(54) STATELESS COMMUNICATION USING A STATEFUL PROTOCOL

(71) Applicant: F5 Networks, Inc., Seattle, WA (US)

(72) Inventors: Peter Michael Thornewell, Seattle, WA (US); John Francis Tavares, Seattle, WA (US); Robert Andrew Kovalchik, Seattle, WA (US)

(73) Assignee: F5, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/916,861

(22) Filed: Jun. 30, 2020

Related U.S. Application Data

(63) Continuation of application No. 16/119,985, filed on Aug. 31, 2018, now Pat. No. 10,708,393.

(60) Provisional application No. 62/553,081, filed on Aug. 31, 2017.

(51) Int. Cl.
| | |
|---|---|
| *G06F 15/173* | (2006.01) |
| *H04L 69/16* | (2022.01) |
| *H04L 9/40* | (2022.01) |
| *H04L 67/14* | (2022.01) |
| *H04L 47/32* | (2022.01) |

(52) U.S. Cl.
CPC ............ *H04L 69/16* (2013.01); *H04L 47/323* (2013.01); *H04L 63/12* (2013.01); *H04L 67/14* (2013.01)

(58) Field of Classification Search
None
See application file for complete search history.

(56) References Cited

U.S. PATENT DOCUMENTS

| | | | |
|---|---|---|---|
| 6,601,101 B1 | 7/2003 | Lee et al. | |
| 6,779,033 B1 * | 8/2004 | Watson | H04L 29/06 709/227 |
| 7,802,001 B1 | 9/2010 | Petry et al. | |

(Continued)

OTHER PUBLICATIONS

F5 Networks, Inc., "Generic Message Example," https://support.f5.com/kb/en-us/products/big-ip_ltm/manuals/product/bigip-service-provider-generic-message-administration-13-0-0/4.html, Updated Mar. 27, 2018; pp. 1-9.

(Continued)

*Primary Examiner* — Phuoc H Nguyen
(74) *Attorney, Agent, or Firm* — John W. Branch; Branch Partners PLLC

(57) ABSTRACT

Embodiments are directed to stateless communication using a stateful protocol. One or more NTMAs may establish a connection with a client computer based on data exchanged with a the client computer using the stateful protocol. The exchanged data may include validation information provided by the one or more NTMAs. The exchanged data and other information associated with the connection may be discarded from one or more memories of the one or more NTMAs. A network packet communicated over the network using the stateful protocol may be obtained. Verification information and candidate validation information may be generated based on one or more characteristics of the network packet. The network packet may be validated based on a comparison of the verification information and the candidate validation information. A reply that adheres to the stateful protocol may be provided to the client computer based on the validated network packet.

20 Claims, 10 Drawing Sheets

(56) References Cited

U.S. PATENT DOCUMENTS

| | | | | |
|---|---|---|---|---|
| 7,881,215 | B1* | 2/2011 | Daigle | H04L 67/142 |
| | | | | 370/252 |
| 9,729,416 | B1* | 8/2017 | Khanal | H04L 41/065 |
| 2004/0024894 | A1 | 2/2004 | Osman et al. | |
| 2011/0040826 | A1* | 2/2011 | Chadzelek | H04L 67/142 |
| | | | | 709/203 |
| 2017/0289270 | A1* | 10/2017 | Li | H04L 41/12 |

OTHER PUBLICATIONS

F5 Networks, Inc., "Big-IP DNS: Implementations", https://support.f5.com/content/kb/en-us/products/big-ip-dns/manuals/product/bigip-dns-implementations-13-1-0/_jcr_content/pdfAttach/download/file.res/BIG-IP_DNS_Implementations.pdf, Version 13.1, Published on Jun. 21, 2018, pp. 1-126.

Office Communication for U.S. Appl. No. 16/119,985 dated Mar. 4, 2020, pp. 1-9.

* cited by examiner

STATELESS COMMUNICATION USING A STATEFUL PROTOCOL

CROSS-REFERENCE TO RELATED APPLICATIONS

This Utility Patent Application is a Continuation of U.S. patent application Ser. No. 16/119,985 filed on Aug. 31, 2018, now U.S. Pat. No. 10,708,393 issued on Jul. 7, 2020, which is based on previously filed U.S. Provisional Patent Application Ser. No. 62/553,081 filed on Aug. 31, 2017 entitled "STATELESS COMMUNICATION USING A STATEFUL PROTOCOL," the benefit of the filing date of which is hereby claimed under 35 U.S.C. § 120 and § 119(e), and which are each further incorporated in entirety by reference.

TECHNICAL FIELD

The present invention relates generally to network traffic management and, more particularly, but not exclusively to methods for improving the performance of stateful network protocols.

BACKGROUND

The increasing use of Internet based services has led to a rapid increase in the number of network connections between clients and servers. Network traffic management apparatuses (NTMAs) such as load balancers, firewalls, or the like, may often be used to manage and process network traffic and network connections between and among clients and servers. In some applications there may be thousands or millions of connections that need to be managed by NTMAs. Often, a client establishes a network connection with a server by using stateful network protocols, such as Transmission Control Protocol/Internet Protocol ("TCP/IP"), or the like. Such stateful network protocols often have standard multi-step handshaking processes for establishing connections, exchanging data, and closing connections, and the like. In many cases, the state associated with these multi-step transactions has to be maintained, consuming memory resources of the NTMAs, or the like. Thus, it is with respect to these considerations and others that the invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
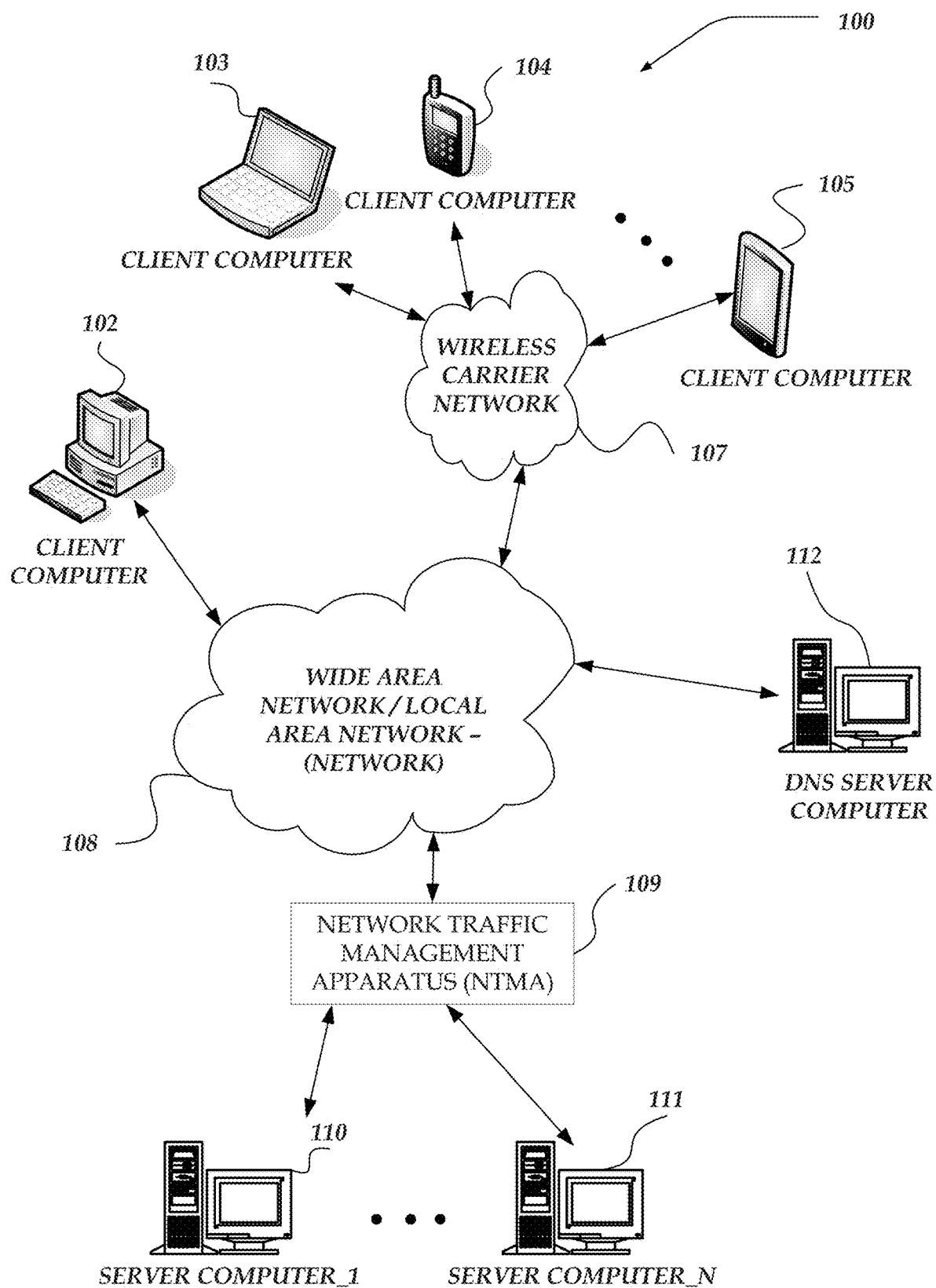
FIG. 1 illustrates a system diagram of an exemplary environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "tuple" refers to a set of values that identify a source and destination of a network packet, which may, under some circumstances, be a part of a network connection. In one or more of the various embodiments, a 5-tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. In one or more of the various embodiments, source port numbers may include a TCP source port number. Likewise, in one or more of the various embodiments, a destination port number may include a TCP destination port number. In one or more of the various embodiments, tuples may be used to identify network flows (e.g., connection flows). However, a tuple need not be a 5-tuple, and other combinations of the above may also be used. For example, a tuple may be a four-tuple, using a source IP address, a destination IP address, a source port number, or a destination port number. Other combinations are also considered. Moreover, as used herein, a "flow key" refers to a key that may be generated based on a tuple comprising some combination of fields specific to the embodiments that can be extracted from a network packet header, including those fields identified above.

As used herein, the terms "network flow," "connection flow," or "flow" refer to a network session established between two endpoints. In one or more of the various embodiments, a tuple may uniquely identify the flow. In one or more of the various embodiments, flow routing data associated with connection flows may be used to ensure that the network packets sent between endpoints of a connection flow may be routed along the same path. In one or more of the various embodiments, the performance of connection oriented network protocols such as TCP/IP may be impaired if network packets may be routed using varying paths or directed to different endpoints. Further, one or more protocol options may be associated with a flow enabling endpoints to employ one or more features of a protocol that may be otherwise optional.

As used herein, the term "network traffic" refers to data or information communicated over a network flow. This information may be arranged according to the underlying network technology (e.g., Ethernet, Token Ring, ATM, or the like). Also, the information may be further arranged based on the network protocols (e.g., Transmission Control Protocol (TCP), User Datagram Protocol (UDP), Secure Shell (SSH), File Transfer Protocol (FTP), or the like) that are being used. Network traffic is often described in terms of packets, bytes, frames, streams, channels, or the like, depending on the applications and protocols being employed.

As used herein, the terms "network destination," or "network address" refer to a name or number used to identify one or more items, objects, services, or locations in a communication network. In some cases, the network destination or network address may represent a single unique endpoint on the network. In other cases, the network destination or network address may represent of one or more endpoints that each share one or more similar network communication attributes or characteristics. In one or more of the various embodiments, the elements that comprise tuples may be considered network destinations or components of a network destination. Also, network destinations may be defined using one or more sub-networking masks, wildcards, matching patterns, or the like. Network communication/monitoring/metrics may be directed to one or more network destinations.

As used herein, the term "policy rule" refers to conditions and actions that may be paired together such that, if a condition is met, then the corresponding action should be executed. In one or more of the various embodiments, conditions may be compound conditions comprised of multiple conditions. In one or more of the various embodiments, actions may also be compound actions, or, in other words, multiple actions may be associated with a condition or a policy rule. Policy rules may be arranged to perform various network traffic management actions on network traffic, such as load balancing, network flow steering, firewalling, modifying traffic data, enforcing security, caching, compression, decompression, cryptographic operations, proxying, traffic routing, traffic switching, bandwidth shaping, quota tracking, or the like.

As used herein, the term "policy" refers to a plurality of policy rules grouped together based on reasons, such as semantic similarity, domain similarity, or the like. In one or more of the various embodiments, policy rules may be grouped into policies for any arbitrary reason to support the network management goals of a user/administrator of a traffic management device or name service device.

As used herein, the term "Domain Name System (DNS)" refers to one or more server computers that are arranged to maintain a hierarchal index that maintains a mapping of network names to network resources. A typical example maintains a mapping of network names to network addresses and an additional "reverse" mapping of network addresses to network names. DNS server computers may generate and communicate responses to requests that are sent from client computers, network computers, server computers, other DNS server computers, or the like. A DNS query will include a name, such as a domain name or hostname of a computer server. The DNS server computer will look up the name in the DNS server computer's index and return the network address that is associated with the name provided by the request (if any). Also, DNS server computers may be arranged to perform reverse lookups that return the hostname/domain name of computer from a valid network address. In some cases, when the information to answer a valid request is unavailable locally, a DNS server computer may be arranged to request the information from another DNS server computer. Further, DNS server computers may use one or more well-known protocols for communicating over networks.

As used herein, the term "Network Traffic Management Apparatus (NTMA)" refers to one or more network computers that are arranged to manage network traffic between one or more client computers and one or more server computers. In some embodiments, NTMAs may perform operations of routing, translating, switching packets, network address translation, firewall services, network flow routing, or the like. In some embodiments, NTMAs may inspect incoming network packets, may perform an address translation, port translation, a packet sequence translation, or the like, and may route the network packets based on the packet inspection. In some embodiments, NTMAs may perform load balancing operations to determine a server computer to direct a request. Such load balancing operations may be based on network traffic, network topology, capacity of a server, content requested, or other traffic distribution mechanisms. Also, in some embodiments, NTMAs may be arranged to respond to client requests directly.

As used herein, the term "stateful protocol" refers to communication protocols that, when conventionally implemented for communication between two endpoints, typically result in the endpoints preserving connection information in memory (or modified instances thereof) to sustain a connection between the two endpoints. For example, when a client and a server conventionally employ Transmission Control Protocol (TCP) to communicate with each other, the client and the server exchange connection information, preserve the connection information (or modified instances thereof) in memory, and include the connection information (or modified instances thereof) in various messages provided and obtained by the endpoints during the life of the connection.

As used herein, the term "stateless communication" refers to communication between two endpoints such that one or more of the two endpoints does not preserve connection information (or modified instances thereof) in memory. For example, in some embodiments, when providing stateless communication using a stateful protocol, one of the endpoints (e.g., a client) may initiate a connection with another one of the endpoints (e.g., a server). In this example, the client and the server may exchange connection information. Continuing with this example, the client may preserve the connection information (or modified instances thereof) in memory during the life of the connection, as conventionally performed when using the stateful protocol. In contrast, in this example, the server may not preserve the connection information in memory (or modified instances thereof) and, instead, may rely on the client to provide the connection information (or modified instances thereof) in each communication. During the life of the connection, in this example, the server may lack any information that indicates that the connection exists. Accordingly, in this example, the server may provide stateless communication using the stateful protocol by communicating with the client using the stateful protocol without retaining connection information over the life of the connection.

As used herein, the terms "synchronize cookie" and "SYN cookie" refer to values that are generated, otherwise constructed or selected, or the like based on one or more rules or policies. In one or more of the various embodiments, a SYN cookie may be constructed based on one or more characteristics of an obtained packet, such as tuple information, a sequence number (SEQ number), a time of arrival, or the like. In some embodiments, a SYN cookie may be constructed by applying a hash function, another cryptographic function, or the like to the one or more characteristics of the obtained packet. In some embodiments, a SYN cookie (or modified instances thereof) may be employed throughout the duration of a connection between two endpoints to verify communications. In one or more of the various embodiments, one or more hash key functions may be employed to generate the hash key value. In some embodiments, the hash key values may be computed by one or more special purpose processors, such as DFS 366, or the like, as described below.

As used herein, the term "packet data" refers to one or more portions of packet payloads. In one or more of the various embodiments, packet data of a request from a client to a server may include information that the client is attempting to post to the server. In some of the various embodiments, packet data of a request from a client to a server may include the information that identifies a service that the client intends to obtain from the server (e.g., name service or the like).

As used herein, the term "validation information" refers to connection information that an endpoint generates or otherwise constructs during initiation of a connection with another endpoint. In one or more of the various embodiments, validation information may be generated or otherwise constructed based on one or more characteristics of a packet provided by the other endpoint. For example, when employing TCP, validation information can refer to a SYN cookie that an endpoint generates or otherwise constructs based on one or more characteristics of a packet that the endpoint obtains from another endpoint.

As used herein, the term "candidate validation information" refers to connection information that an endpoint extracts from a packet or generates based on one or more characteristics of the packet and that should, if the packet is valid, correspond to the validation information that the endpoint generated or otherwise constructed during initiation of a connection. For example, when employing TCP, candidate validation information can refer to an acknowledgement (ACK) number included in an obtained packet or a modified value of the ACK number (e.g., the value of the ACK number, decremented by one).

As used herein, the term "verification information" refers to connection information that an endpoint generates or otherwise constructs based on the same process used to generate or otherwise construct the validation information, wherein, to generate or otherwise construct the verification information, the process is applied to one or more characteristics of a packet obtained after initialization of a connection. The verification information should, if the packet is valid, correspond to the candidate validation information. For example, when employing TCP, verification information can refer to a SYN cookie generated or otherwise constructed based on one or more characteristics of a packet obtained after initialization of a connection.

As used herein, the terms "request" refers to either client push request or a client query request, or any complete message from a client.

The following briefly describes various portions of the various embodiments to provide a basic understanding of some aspects of the invention. This brief description is not intended as an extensive overview. It is not intended to identify key or critical elements or to delineate or otherwise narrow the scope. Its purpose is merely to present some concepts in a simplified form as a prelude to the more detailed description that is presented later.

Briefly stated, various embodiments are directed towards providing stateless communication using a stateful protocol. In one or more of the various embodiments, a client computer may initialize a connection with one or more traffic monitoring computers (NTMAs). In some of the various embodiments, the one or more NTMAs may drop the connection. In some embodiments, the one or more NTMAs may obtain a packet from the client after dropping the connection. In some embodiments, the one or more NTMAs may validate the obtained packet based on one or more characteristics of the obtained packet. In some embodiments, the one or more NTMAs may provide data included in the obtained packet only if the one or more NTMAs successfully validate the obtained packet.

In one or more of the various embodiments, the obtained packet may include connection information that corresponds to information that was exchanged between the client and the one or more NTMAs when initializing the connection. In some of the various embodiments, the one or more NTMAs may generate verification information and candidate validation information based on one or more characteristics of the obtained packet, such as the connection information. In some embodiments, the one or more NTMAs may validate the obtained packet if the verification information corresponds to the candidate validation information. In some embodiments, the one or more NTMAs may validate the obtained packet if a request included in the obtained packet is complete (e.g., a request that does not span multiple packets).

In some of the various embodiments, the one or more NTMAs may attempt to validate the obtained packet only if the one or more NTMAs determine that the obtained packet is a data packet.

Also briefly stated, various embodiments are directed towards stateless communication using a stateful protocol. In one or more of the various embodiments, one or more processors in one or more network traffic management apparatuses (NTMAs) may establish a connection with a client computer based on data exchanged between the one or more NTMAs and the client computer using the stateful protocol, such that the exchanged data includes validation information provided by the one or more NTMAs. In some of the various embodiments, the one or more processors in the one or more NTMAs may discard the exchanged data and other information associated with the connection from one or more memories of the one or more NTMAs. In some embodiments, the one or more processors in the one or more NTMAs may obtain a network packet communicated over the network using the stateful protocol. In some embodiments, the one or more processors in the one or more NTMAs may generate verification information and candidate validation information based on one or more characteristics of the network packet. In some embodiments, the one or more processors in the one or more NTMAs may validate the network packet based on a comparison of the verification information and the candidate validation information. In some embodiments, the one or more processors in the one or more NTMAs may provide a response to the client computer based on the validated network packet, such that the response adheres to the stateful protocol.

In one or more of the various embodiments, the one or more processors are the same processor. In some of the various embodiments, the one or more processors are in the same NTMA.

In one or more of the various embodiments, discarding the exchanged data and the other information may include one or more of overwriting, releasing, or freeing memory that is associated with in-memory representations of the exchanged data and the other information.

In one or more of the various embodiments, generating the verification information may include modifying one or more values included in the obtained network packet. In some of the various embodiments, the verification information may be generated based on the one or more modified values.

In one or more of the various embodiments, generating the candidate validation information may include modifying one or more values included in the obtained network packet. In some of the various embodiments, the candidate validation information may be generated based on the one or more modified values.

In one or more of the various embodiments, providing the reply to the client computer may include modifying one or more values included in the generated verification information based on a length of a portion of the validated network packet. In some of the various embodiments, another network packet that conforms to Transmission Control Protocol (TCP) may be provided. In some embodiments, the one or more modified values may be included in one or more sequence number fields of the other network packet. In some embodiments, the other network packet may be provided to the client computer using TCP.

In one or more of the various embodiments, the validation information provided by the one or more NTMAs may include a SYN cookie that is in accordance with TCP.

Illustrated Operating Environment

FIG. 1 illustrates components of one embodiment of an environment in which the invention may be practiced. Not all of the components shown may be required to practice the invention, and variations in the arrangement and type of the components may be made without departing from the spirit or scope of the invention.

As shown, system 100 of FIG. 1 includes local area networks (LANs)/wide area networks (WANs)—network 108, wireless network 107, client computers 102-105, network traffic management apparatus (NTMA) 109, server computers 110-111, and Domain name system server computer 112. Network 108 is in communication with and enables network traffic for communication between client computers 102-105, wireless network 107, NTMA 109, and DNS server computer 112. Wireless carrier network 107 further enables communication with wireless devices, such as client computers 103-105. NTMA 109 is in communication with network 108, server computers 110-111, and DNS server computer 112.

One embodiment of client computers 102-105 is described in more detail below in conjunction with FIG. 2.

In some embodiments, one or more of client computers 102-105 may operate over a wired or a wireless network, such as networks 107 or 108. Generally, client computers 102-105 may include virtually any computer capable of communicating over a network to send and receive information, including instant messages, performing various online activities, or the like. It should be recognized that more or fewer client computers may be included within a system such as the exemplary system described herein, and embodiments are therefore not constrained by the number or type of client computers employed.

Computers that may operate as client computer 102 may include computers that typically connect using a wired or wireless communications medium, such as personal computers, servers, multiprocessor systems, microprocessor-based or programmable consumer electronics, network PCs, or the like. In some embodiments, client computers 102-105 may include virtually any portable computer capable of connecting to another computer and receiving information, such as laptop computer 103, smart phone 104, tablet computer 105, or the like. However, portable computers are not so limited and may also include other portable computers, such as cellular telephones, display pagers, radio frequency (RF) devices, infrared (IR) devices, Personal Digital Assistants (PDAs), handheld computers, wearable computers, integrated devices combining one or more of the preceding devices, or the like. As such, client computers 102-105 typically range widely in terms of capabilities and features. Moreover, client computers 102-105 may provide access to various computing applications, including a browser, or other web-based applications.

A web-enabled client computer may include a browser application that is configured to receive and to send web pages, web-based messages, and the like. The browser application may be configured to receive and display graphics, text, multimedia, or the like, employing virtually any web-based language, including a wireless application protocol messages (WAP) or the like. In some embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), or the like to display and send a message. In some embodiments, a user of the client computer may employ the browser application to perform various activities over a network (online). However, another application may also be used to perform various online activities.

Client computers 102-105 also may include one or more other client applications that are configured to receive or send data to another computer. The client application may include a capability to send or receive content or the like. The client application may further provide information that identifies itself, including a type, capability, name, or the like. In some embodiments, client computers 102-105 may uniquely identify themselves through any of a variety of mechanisms, including a phone number, Mobile Identification Number (MIN), an electronic serial number (ESN), or other mobile computer identifier. The information may also indicate a content format that the mobile computer is enabled to employ. Such information may be provided in a network packet, or the like, sent between other client computers, NTMA 109, server computers 110-111, DNS server computer 112, or other computers.

Client computers 102-105 may further be configured to include a client application that enables an end-user to log into an end-user account that may be managed by another computer, such as server computers 110-111 or the like. Such end-user account, in one or more examples, may be configured to enable the end-user to manage one or more online activities, including in one or more examples, search activities, social networking activities, browse various websites, communicate with other users, participate in gaming, interact with various applications, or the like. However, participation in online activities may also be performed without logging into the end-user account.

Wireless carrier network 107 is configured to couple client computers 103-105 and its components with network 108. Wireless carrier network 107 may include any of a variety of wireless sub-networks that may further overlay stand-alone ad-hoc networks or the like to provide an infrastructure-oriented connection for client computers 102-105. Such sub-networks may include mesh networks, Wireless LAN (WLAN) networks, cellular networks, or the like. In one or more embodiments, the system may include more than one wireless network.

Wireless carrier network 107 may further include an autonomous system of terminals, gateways, routers, or the like connected by wireless radio links or the like. These connectors may be configured to move freely and randomly and organize themselves arbitrarily, such that the topology of wireless carrier network 107 may change rapidly.

Wireless carrier network 107 may further employ a plurality of access technologies including $2^{nd}$ (2G), $3^{rd}$ (3G), $4^{th}$ (4G), or $5^{th}$ (5G) generation radio access for cellular systems, WLAN, Wireless Router (WR) mesh, or the like. Access technologies such as 2G, 3G, 4G, 5G, or future access networks may enable wide area coverage for mobile computers, such as client computers 103-105 with various degrees of mobility. In one or more examples, wireless carrier network 107 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), or the like. In essence, wireless carrier network 107 may include virtually any wireless communication mechanism by which information or network traffic may travel between client computers 103-105 and another computer, network, or the like.

Network 108 is configured to couple network computers with other computers, including server computers 110-111, NTMA 109, DNS server computer 112, client computer 102, and client computers 103-105 through wireless network 107. Network 108 is enabled to employ any form of computer readable media for communicating information in the form network traffic from one electronic device to another. Also, network 108 can include the Internet in addition to LANs, WANs, direct connections, such as through a universal serial bus (USB) port, other forms of computer readable media, or the like. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including, for example, DS-0, DS-1, DS-2, DS-3, DS-4, OC-3, OC-12, OC-48, or the like. Network traffic communicated over a network may include various signals associated with the low-level operation of the network, routing, as well as higher-level communication for applications. Furthermore, remote computers and other related electronic devices could be remotely connected to either LANs or WANs via a modem and temporary telephone link. In some embodiments, network 108 may be configured to transport information of an Internet Protocol (IP). In essence, network 108 includes any communication method by which information or network traffic may travel between computers.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of NTMA 109 is described in more detail below in conjunction with FIG. 3. Briefly, however, NTMA 109 may include virtually any network computer capable of managing network traffic between client computers 102-105 and server computers 110-111. In some embodiments, NTMA 109 may be a multiprocessor system that includes one or more hardware processors. Such computers include, for example, routers, proxies, firewalls, load balancers, cache devices, devices that perform network address translation, or the like. NTMA 109 may perform the operations of routing, translating, switching packets, network address translation, firewall services, network flow routing, or the like. In some embodiments, NTMA 109 may inspect incoming network packets, may perform an address translation, port translation, a packet sequence translation, or the like, and may route the network packets based on the packet inspection. In some embodiments, NTMA 109 may perform load balancing operations to determine a server computer to direct a request. Such load balancing operations may be based on network traffic, network topology, capacity of a server, content requested, or other traffic distribution mechanisms.

NTMA 109 may be arranged to perform hardware-optimized operations that perform statistics gathering, per-subscriber policy enforcement, per-packet policy enforcement (e.g., packet address translations), high-speed flow caches, or the like, on managed connection flows between client computers, such as client computers 102-105, and server computers, such as server computers 110-111. In some embodiments, the one or more processors of NTMA 109 may be arranged to perform one or more specific tasks for traffic management as described in detail below.

In one or more of the various embodiments, NTMA 109 may include a control segment and a separate data flow segment. In some of the various embodiments, the control segment may include software operations that perform high-level control functions and per-flow policy enforcement for traffic management. In some embodiments, the control segment may be configured to manage connection flows maintained at the data flow segment. In some embodiments, the control segment may provide instructions, such as, for example, a packet translation instruction, to the data flow segment to enable the data flow segment to route received packets to a server computer, such as server computers 110-111. In some embodiments, the data flow segment may include hardware operations that perform statistics gathering, per-packet policy enforcement (e.g., packet address translations), high-speed flow caches, or the like, on connection flows maintained at the data flow segment between client computers, such as client computers 102-105, and server computers, such as server computers 110-111.

Server computers 110-111 may include virtually any network computer that may operate as a website server. However, server computers 110-111 are not limited to website servers and may operate as messaging server, a File Transfer Protocol (FTP) server, a database server, content server, email servers, or the like. Additionally, each of server computers 110-111 may be configured to perform a different operation. Computers that may operate as server computers 110-111 include various network computers, including personal computers, desktop computers, multiprocessor systems, microprocessor-based or programmable consumer electronics, network PCs, server computers, network appliances, or the like.

Although FIG. 1 illustrates server computers 110-111 as single computers, the invention is not so limited. For example, one or more functions of each of server computers 110-111 may be distributed across one or more distinct network computers. Moreover, server computers 110-111 are not limited to a particular configuration. Thus, in some embodiments, server computers 110-111 may contain a plurality of network computers that operate using a master/slave approach, where one of the plurality of network computers of server computers 110-111 operate to manage or otherwise coordinate operations of the other network computers. In other embodiments, the server computers 110-111 may operate as a plurality of network computers within a cluster architecture, a peer-to-peer architecture, virtual machines, or even within a cloud architecture. Thus, the invention is not to be construed as being limited to a single environment, and other configurations and architectures are also envisaged. Likewise, NTMA 109 may be comprised of a hypervisor and one or more virtual machines that may perform network management operations. In some embodiments, one or more operations may be performed by the same or different processor.

Illustrative Client Computer

Figure 2:
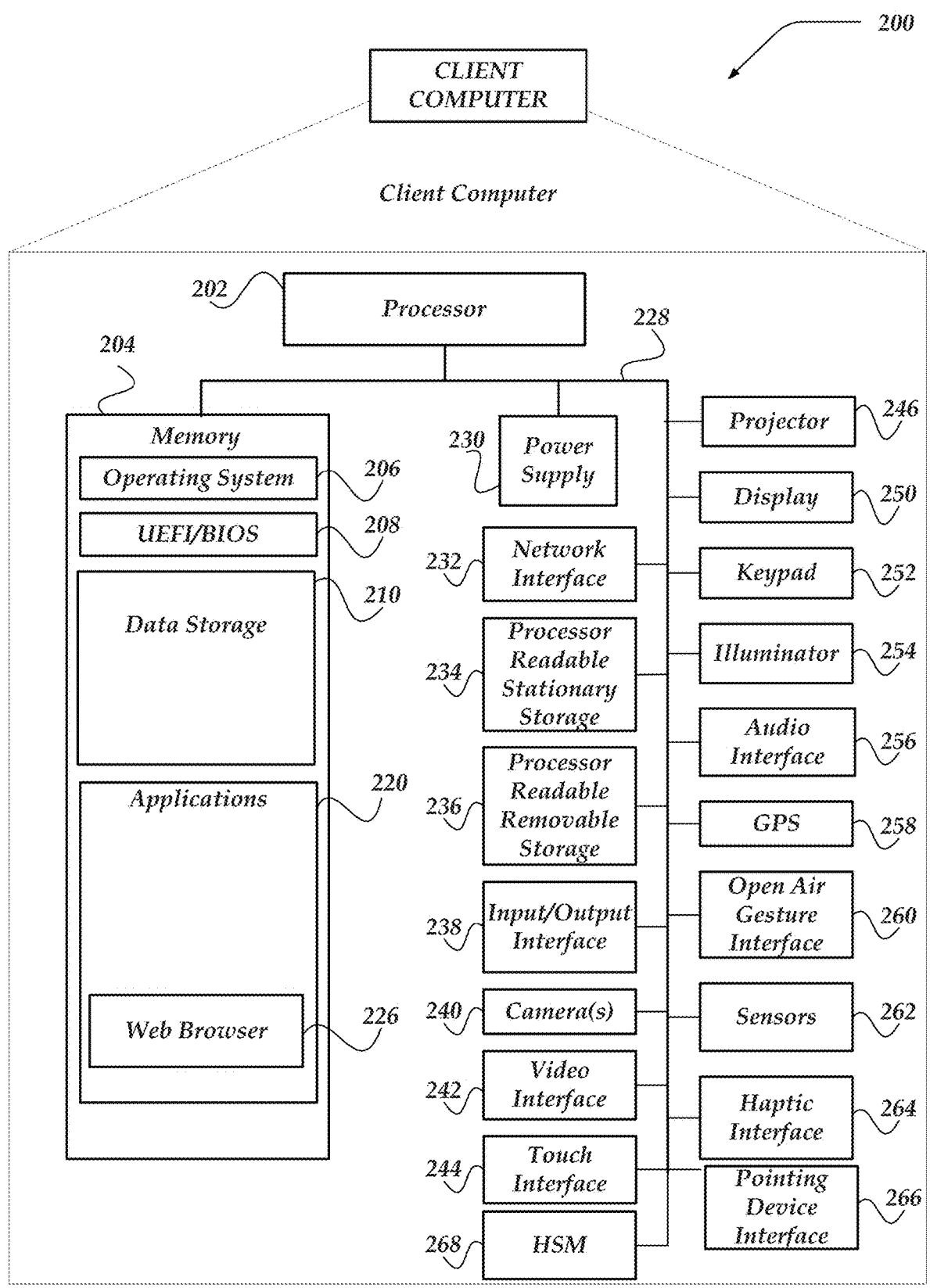
FIG. 2 shows an embodiment of an exemplary client computer that may be included in a system such as that shown in FIG. 1.

FIG. 2 shows one embodiment of client computer 200 that may include many more or less components than those shown. Client computer 200 may represent, for example, one or more embodiments of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, or processor-readable removable storage device 236. Client computer 200 may optionally communicate with a base station (not shown) or directly with another computer. In one or more embodiments, although not shown, a gyroscope may be employed within client computer 200 to measure or maintain an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks and is constructed for use with one or more communication protocols and technologies including protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals, such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, or the like.

Display 250 may be a liquid crystal display (LCD), gas plasma, electronic ink, light emitting diode (LED), Organic LED (OLED), or any other type of light reflective or light transmissive display that can be used with a computer. Display 250 may also include a touch interface 244 arranged to receive input from an object, such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, or other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information, such as keys, digital certificates, passwords, passphrases, two-factor authentication information, or the like. In some embodiments, hardware security module may be employed to support one or more standard public key infrastructures (PKI) and may be employed to generate, manage, or store keys pairs or the like. In some embodiments, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, or the like. Input/output interface 238 can utilize one or more technologies, such as Universal Serial Bus (USB), Infrared, Wi-Fi™, WiMax, Bluetooth™, or the like.

Haptic interface 264 may be arranged to provide tactile feedback to a user of the client computer. For example, the haptic interface 264 may be employed to vibrate client computer 200 in a particular way when another user of a computer is calling. Open air gesture interface 260 may sense physical gestures of a user of client computer 200, for example, by using single or stereo video cameras, radar, a gyroscopic sensor inside a computer held or worn by the user or the like. Camera 240 may be used to track physical eye movements of a user of client computer 200.

In one or more of the various embodiments, client computer 200 may also include sensors 262 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 262 may be one or more hardware sensors that collect or measure data that is external to client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, or the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include audio devices, pointing devices, keypads, displays, cameras, projectors, or the like. These peripheral components may communicate over a Pico Network such as Bluetooth™ Zigbee™, or the like.

A client computer may include web browser application 226 that may be configured to receive and to send web pages, web-based messages, graphics, text, multimedia, or the like. The client computer's browser application may employ virtually any programming language, including a wireless application protocol messages (WAP) or the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like.

Memory 204 may include RAM, ROM, or other types of memory. Memory 204 illustrates an example of computer-readable storage media (devices) for storage of information such as computer-readable instructions, data structures, program modules or other data. Memory 204 may store UEFI/BIOS 208 for controlling low-level operation of client computer 200. The memory may also store operating system 206 for controlling the operation of client computer 200. It will be appreciated that this component may include a general-purpose operating system, such as a version of UNIX, or Linux, or a specialized client computer communication operating system, such as Windows Phone, Android Operating System, or Apple's iOS operating system. The operating system may include or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, or the like for use by a processor, such as processor 202 to execute and perform actions. In some embodiments, one or more portions of data storage 210 might also be stored on another component of client computer 200, including non-transitory processor-readable removable storage device 236, processor-readable stationary storage device 234, or even external to the client computer. Applications 220 may include computer executable instructions which, when executed by client computer 200, transmit, receive, or otherwise process instructions and data, such as communicating name service requests to NTMA 109 or receiving name service responses from NTMA 109.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, or the like.

In one or more of the various embodiments, applications, such as web server 226, other applications, or the like, may be arranged to employ geo-location information to select one or more localization features, such as time zones, languages, currencies, calendar formatting, or the like. Localization features may be used in user-interfaces and well as internal processes or databases. In one or more of the various embodiments, geo-location information used for selecting localization information may be provided by GPS 258. Also, in some embodiments, geolocation information may include information providing using one or more geolocation protocols over the networks, such as wireless network 108 or network 111.

Additionally, in one or more embodiments (not shown in the figures), client computer 200 may include an embedded logic hardware device instead of a CPU or as an adjunct to a CPU, such as an Application Specific Integrated Circuit (ASIC), Field Programmable Gate Array (FPGA), Programmable Array Logic (PAL), or the like. The embedded logic hardware device may directly execute its embedded logic to perform actions. Also, in one or more embodiments (not shown in the figures), the network computer may include a hardware microcontroller instead of a CPU. In one or more embodiments, the microcontroller may directly execute its own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
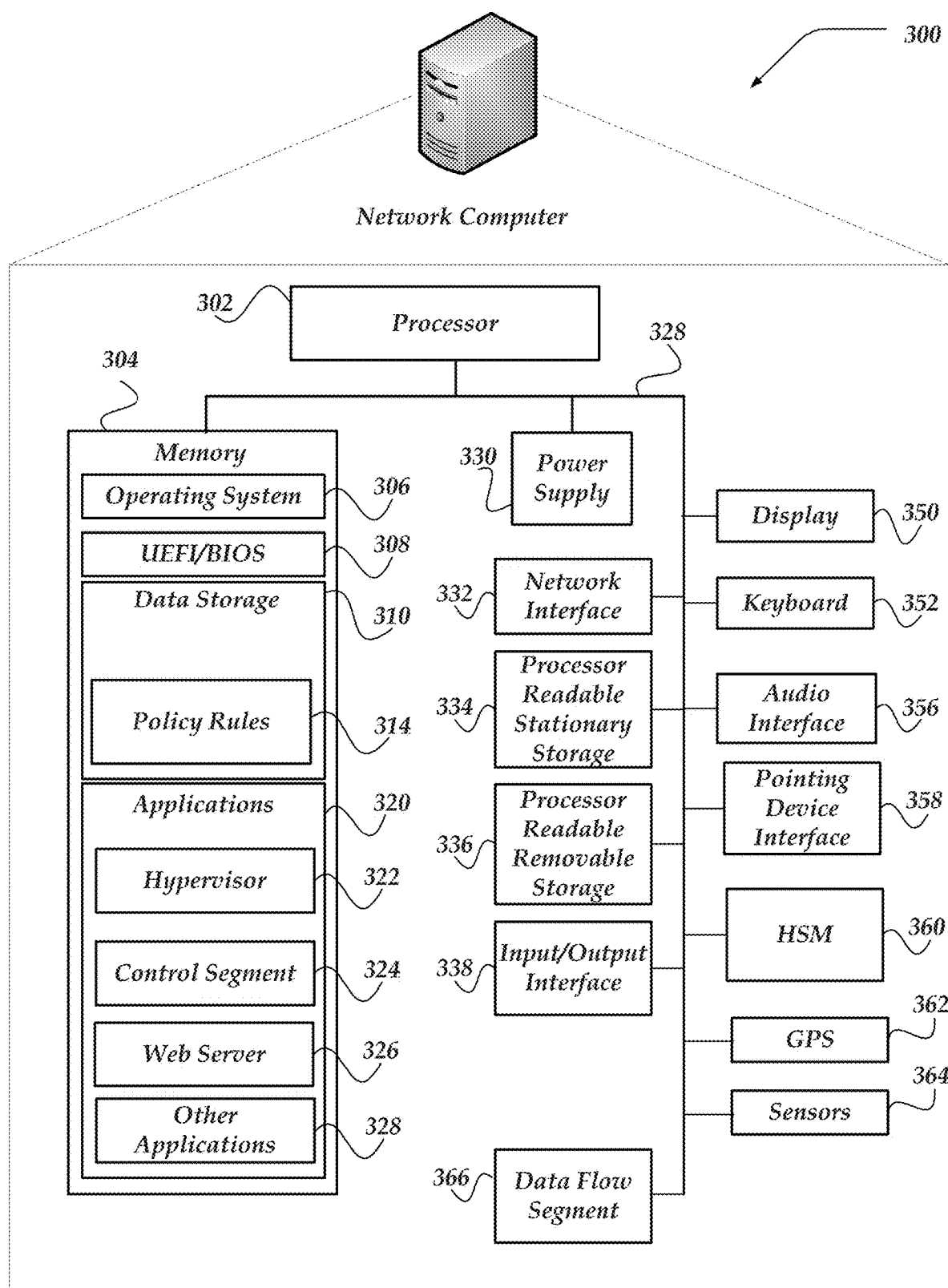
FIG. 3 illustrates an embodiment of an exemplary network computer that may be included in a system such as that shown in FIG. 1.

FIG. 3 illustrates one embodiment of network computer 300 that may be included in a system implementing one or more embodiments of the described innovations. Network computer 300 may include many more or less components than those shown in FIG. 3. However, the components shown are sufficient to disclose an illustrative embodiment for practicing these innovations. Network computer 300 may represent, for example, one embodiment of traffic system management computer (NTMA) 109 of FIG. 1.

As shown in the figure, network computer 300 includes a processor 302 in communication with a memory 304 via a bus 328. Network computer 300 also includes a power supply 330, network interface 332, audio interface 356, global positioning systems (GPS) receiver 362, display 350, keyboard 352, input/output interface 338, processor-readable stationary storage device 334, and processor-readable removable storage device 336. Power supply 330 provides power to network computer 300.

In one or more of the various embodiments, processor 302 may represent one or more separate processors (not shown). Likewise, in some embodiments, one or more of the processors comprising processor 302 may be arranged to include one or more processors (e.g., cores).

Network interface 332 includes circuitry for coupling network computer 300 to one or more networks, and is constructed for use with one or more communication protocols and technologies including protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired or wireless communication protocols. Network interface 332 is sometimes known as a transceiver, transceiving device, or network interface card (NIC). Network computer 300 may optionally communicate with a base station (not shown) or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, or the like.

GPS transceiver 362 can determine the physical coordinates of network computer 300 on the surface of the Earth, which typically outputs a location as latitude and longitude values. GPS transceiver 362 can also employ other geo-positioning mechanisms, including triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like to further determine the physical location of network computer 300 on the surface of the Earth. It is understood that, under various and different conditions, GPS transceiver 362 can determine a physical location for network computer 300.

Network computer 300 may also include sensors 364 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 364 may be one or more hardware sensors that collect or measure data that is external to network computer 300.

In one or more embodiments, however, network computer 300 may, through other components, provide other information that may be employed to determine a physical location of the client computer, including for example, a Media Access Control (MAC) address, IP address, or the like.

Human interface components may be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like may communicate through pointing device interface 358 to receive user input.

Memory 304 may include Random Access Memory (RAM), Read-Only Memory (ROM), non-transitory, or other types of memory. Memory 304 illustrates an example of computer-readable storage media (devices) for storage of information such as computer-readable instructions, data structures, program modules, or other data. Memory 304 stores a unified extensible firmware interface or basic input/output system or (UEFI/BIOS) 308 for controlling low-level operations of network computer 300. The memory also stores an operating system 306 for controlling the operation of network computer 300. It will be appreciated that this component may include a general-purpose operating system such as a version of UNIX, LINUX™, or a specialized operating system such as Microsoft Corporation's Windows™ operating system or the Apple Corporation's OSX™ operating system. The operating system may include or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of events, including being sent as part of a header during a communication, sent upon request, or the like. Data storage 410 may also be employed to store social networking information including address books, buddy lists, aliases, user profile information, or the like. Data storage 310 may further include program code, data, algorithms, or the like for use by one or more processors, such as processors comprising processor 302 to execute and perform actions such as those actions described below. In some embodiments, one or more portions of data storage 310 might also be stored on another component of network computer 300, including non-transitory media inside processor-readable removable storage device 336, processor-readable stationary storage device 334, or any other computer-readable storage device within network computer 300, or even external to network computer 300. Data storage 310 may include, for example, policy rules/programs 314 or the like.

Applications 320 may include computer executable instructions that, when executed by one or more processors of network computer 300, transmit, receive, or otherwise process messages (e.g., SMS, Multimedia Messaging Service (MMS), Instant Message (IM), email, or other messages), audio, or video and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, or the like. Applications 320 may include hypervisor application 322, control segment 324, web server application 326, other applications 328, or the like that may perform actions further described below. In one or more of the various embodiments, one or more of the applications may be implemented as modules or components of another application. Further, in one or more of the various embodiments, applications may be implemented as operating system extensions, modules, plugins, or the like.

In one or more of the various embodiments, applications, such as hypervisor 322, control segment 324, web server 326, other applications 328, or the like, may be arranged to employ geo-location information to select one or more localization features, such as time zones, languages, currencies, calendar formatting, or the like. Localization features may be used in user-interfaces as well as internal processes or databases. In one or more of the various embodiments, geo-location information used for selecting localization information may be provided by GPS 362. Also, in some embodiments, geolocation information may include information provided using one or more geolocation protocols over the networks, such as wireless network 107 or network 108.

Furthermore, in one or more of the various embodiments, control segment 324 may be operative in a cloud-based computing environment. In one or more of the various embodiments, these applications and others that comprise a NTMA, or that a NTMA comprises, may be executing within virtual machines or virtual servers that may be managed in a cloud-based based computing environment. Also, in one or more of the various embodiments, control segment 324 or the like may be located in virtual servers running in a cloud-based computing environment rather than being tied to one or more specific physical network computers.

Also, in one or more of the various embodiments, control segment 324 may be running in one or more virtual machines (VM's) executing on network computer 300. In one or more of the various embodiments, virtual machines running on network computer 300 may be managed or supervised by hypervisor 322. Likewise, in some embodiments, portions of control segment 324 may be running on one or more processors executing on network computer 300.

Further, network computer 300 may also comprise hardware security module (HSM) 360 for providing additional tamper resistant safeguards for generating, storing or using security/cryptographic information such as keys, digital certificates, passwords, passphrases, two-factor authentication information, or the like. In some embodiments, hardware security module may be employ to support one or more standard public key infrastructures (PKI) and may be employed to generate, manage, or store keys pairs or the like. In some embodiments, HSM 360 may be arranged as a hardware card that may be installed in a network computer.

Network computer 300 may also include data flow segment (DFS) 366 for tracking connection flows between client computers, such as client computers 102-105 of FIG. 1, and server computers, such as server computers 110-111 of FIG. 1. In some embodiments, DFS 366 may include hardware-optimized operations for packet traffic management operations, such as repetitive operations associated with packet traffic management. For example, DFS 366 may perform statistics gathering, per-packet policy enforcement (e.g., packet address translations), per-subscriber policy enforcement, or the like on connection flows maintained at DFS 366. In some embodiments, DFS 366 may route, switch, forward, or otherwise direct packets based on policy rules for a particular connection flow signature (e.g., a 5 tuple of a received packet). Thus, DFS 366 may include capabilities and perform tasks such as that of a router, a switch, a routing switch, firewalls, network address translation, or the like. In one or more of the various embodiments, components of DFS 366 may comprise or work in combination to provide high-speed flow caches for optimizing packet traffic management. In one or more of the various embodiments, DFS 366 may be arranged to include high-speed cache memory for mapping hash keys/identifiers to connection information. In some embodiments, the rules for a particular connection flow signature may be based on instructions received from CS 324. In some embodiments, DFS 366 may store the instructions received from CS 324 in a local memory as a table or another data structure. In some embodiments, DFS 366 may also store a flow state table to indicate a state of current connection flows maintained at DFS 366. In some embodiments, components of DFS 366 may comprise or may work in combination to provide high-speed flow caches for improving packet traffic management.

In one or more of the various embodiments, DFS 366 may provide connection flow updates to CS 324. In some of the various embodiments, a connection flow update may include a status of the connection flow, a current state of the connection flow, other statistical information regarding the connection flow, or the like. In some embodiments, the connection flow update may also include an identifier that corresponds to the connection flow. In some embodiments, the identifier may be generated and provided by CS 324 when a connection flow is established at DFS 366. In some embodiments, the connection flow update may be a connection flow delete update provided to CS 324 after the connection flow is terminated at DFS 366. In some embodiments, the connection flow update or the connection flow delete update may be provided to CS 324 periodically, at predefined time intervals, or the like. In some embodiments, DFS 366 may stagger a time when a plurality of connection flow updates are provided to CS 324.

In one or more of the various embodiments, DFS 366 may include a plurality of data flow segments. In some of the various embodiments, a first data flow segment within DFS 366 may forward packets received from a client computer to a server computer, while a second data flow segment within DFS 366 may forward or route packets received from a server computer to a client computer. In some embodiments, DFS 366 may also be implemented in software.

In one or more of the various embodiments, CS 324 may include a control segment that may include software-optimized operations to perform high-level control functions and per-flow policy enforcement for packet traffic management. In some of the various embodiments, CS 324 may be configured to manage connection flows maintained at DFS 366. In some embodiments, CS 324 may provide instructions, such as, for example, a packet address translation instructions, to DFS 366 to enable DFS 366 to forward received packets to a server computer, such as server computers 110-111 of FIG. 1. In some embodiments, CS 324 may forward or route packets between a client computer and a server computer independent of DFS 366.

In one or more of the various embodiments, CS 324 may include a plurality of control segments. In some of the various embodiments, a plurality of control segments may access or manage connection flows at a single data flow segments or a plurality of data flow segments. In some embodiments, CS 324 may include an internal data flow segment. In one such embodiment, the internal data flow segment of CS 324 may be distributed or separate from CS 318. For example, in some embodiments, CS 324 may be employed in software, while the internal data flow segment may be employed in hardware. In some embodiments, CS 324 may identify if connection flows are split between different data flow segments or between a DFS and a CS, such as DFS 366 and CS 324. In some embodiments, CS 324 may also be implemented in hardware.

In one or more of the various embodiments, CS 324 may be configured to generate an identifier for each connection flow established at DFS 366. In some of the various embodiments, CS 324 may utilize a sequence number of a SYN to generate an identifier for a corresponding connection flow. In some embodiments, the identifier may be based on a hash of the sequence number. In other embodiments, the identifier may be based on an exclusive OR byte operation of the sequence number. In some embodiments, CS 324 may cache the identifier at CS 324 and may provide the identifier to DFS 366. In some embodiments, CS 324 may cache an identifier for each connection flow it establishes at DFS 366.

In one or more of the various embodiments, CS 324 may be configured to detect packet flood attacks such as SYN flood attacks. In some of the various embodiments, if a flood attack may be detected, CS 324 may enter into a flood protection state where flood control filter may be enabled so that new flows may be analyzed to determine if the new connection flow may be genuine rather than associated with a flood attack. In some embodiments, when CS 324 may enter into the flood protection state, CS 324 may transition from stateful communication using a stateful protocol (e.g., Transmission Control Protocol (TCP) or the like) to stateless communication using the stateful protocol based on one or more policy rules or programs, such as policy rules 314.

Additionally, in one or more embodiments (not shown in the figures), network computer 300 may include an embedded logic hardware device instead of a CPU, such as an Application Specific Integrated Circuit (ASIC), Field Programmable Gate Array (FPGA), Programmable Array Logic (PAL), or the like. The embedded logic hardware device may directly execute its embedded logic to perform actions. Also, in one or more embodiments (not shown in the figures), the network computer may include a hardware microcontroller instead of a CPU. In one or more embodiments, the microcontroller may directly execute its own embedded logic to perform actions and access its own internal memory and its own external Input and Output Interfaces (e.g., hardware pins or wireless transceivers) to perform actions, such as System On a Chip (SOC) or the like.

Illustrative Logical System Architecture

Figure 4:
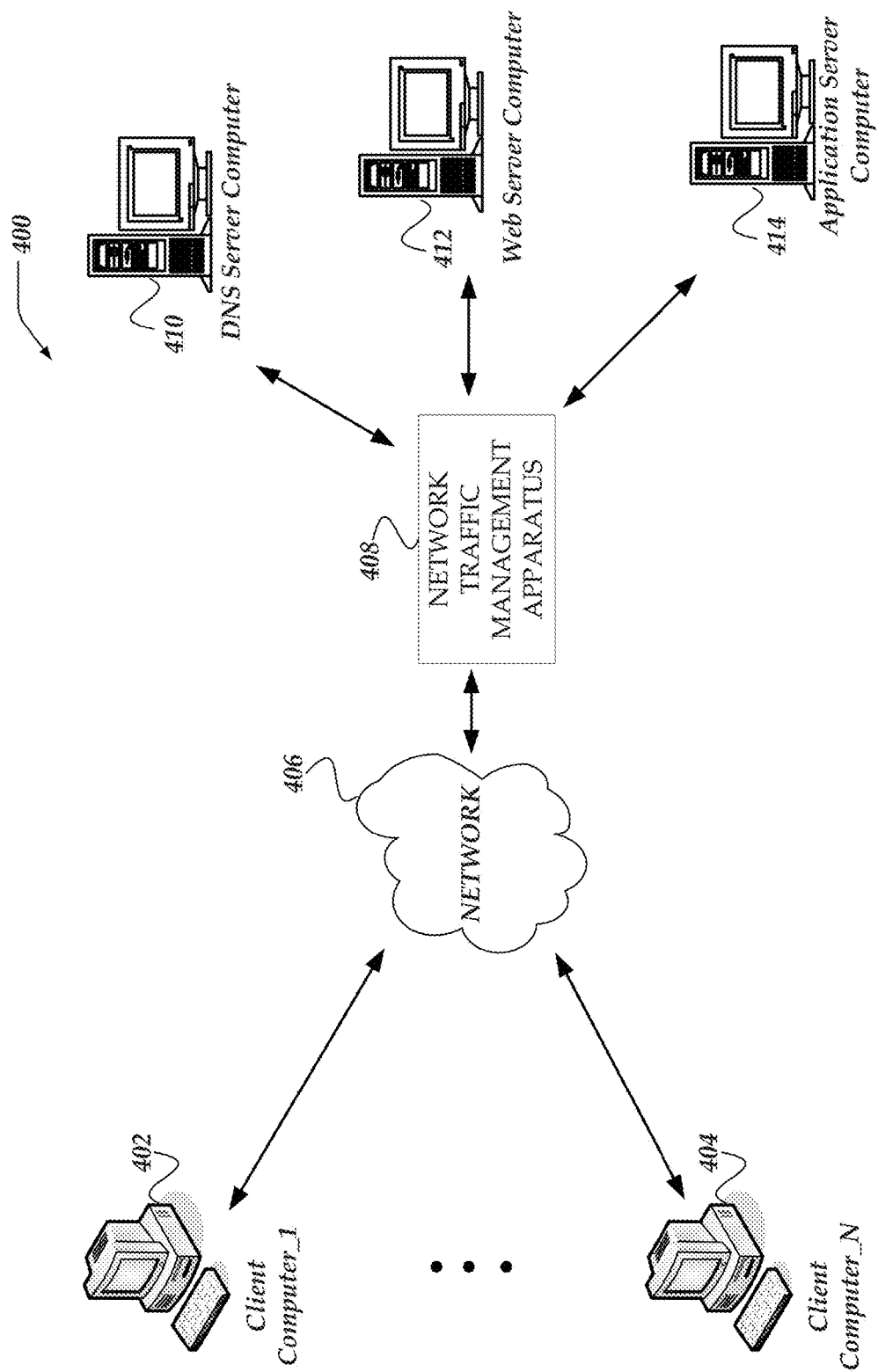
FIG. 4 shows a portion of an exemplary system for stateless communication using a stateful protocol.

FIG. 4 shows a portion of system 400 for stateless communication using a stateful protocol in accordance with one or more of the various embodiments. In one or more of the various embodiments, one or more client computers, such as client computer 402, client computer 404, or the like, may be performing communication over a network, such as network 406. In some of the various embodiments, network 406 may be a network, such as wireless network 107, network 108, or the like. In some embodiments, network 406 may be in communication with NTMA 408. In some embodiments, NTMA 408 may be in communication with one or more server computers, such as DNS server computer 410, web server computer 412, or application server computer 414.

In one or more of the various embodiments, client computers 402-404 may be arranged to communicate requests over network 406 to NTMA 408. For example, in one or more of the various embodiments, client computers 402-404 may communicate requests, such as data, messages, data posts, service requests, name service, or the like. Accordingly, in one or more of the various embodiments, NTMA 408 may be arranged to monitor these requests. In some cases, NTMA 408 may communicate the requests to a server, such as DNS server computer 410, web server computer 412, application server computer 414, or the like. In some embodiments, such communication may include requests for name service information that may be used to answer a name service query from a client computer.

Note, client computers may include any type of computer that needs name service information, such as client computers, network computers, mobile computers, virtual machines (including cloud-based computers), or the like. Likewise, in production environments, one of ordinary skill in the art will appreciate there may be more or fewer DNS server computers, web server computers, application server computers, NTMAs, or client computers than depicted in FIG. 4.

In one or more of the various embodiments, NTMA 408 may be arranged to improve network performance by employing stateless communication using a stateful protocol. In some of the various embodiments, NTMA 408 may be arranged to employ stateless communication using the stateful protocol based on one or more triggering events. In some embodiments, a triggering event may include detection of a potential attack. For example, in some embodiments, NTMA 408 may typically employ stateful communication using the stateful protocol. In this example, NTMA 408 may monitor one or more characteristics of the network traffic, and, if the one or more characteristics are indicative of a potential attack (e.g., a SYN flood, a distributed denial-of-service (DoS) attack, another DoS attack, or the like), NTMA 408 may switch to employing stateless communication using the stateful protocol. In some embodiments, NTMA 408 may return to employing stateful communication using the stateful protocol after a predetermined period of time or once NTMA 408 determines that the one or more characteristics indicate that the potential attack has subsided. Examples of such characteristics of the network traffic may include detecting an error code (e.g., HTTP Error 503—Service Unavailable), a rapid change in traffic quantity or client quantity, or the like. In other embodiments, NTMA 408 may be configured to always employ stateless communication using the stateful protocol.

Figure 5:
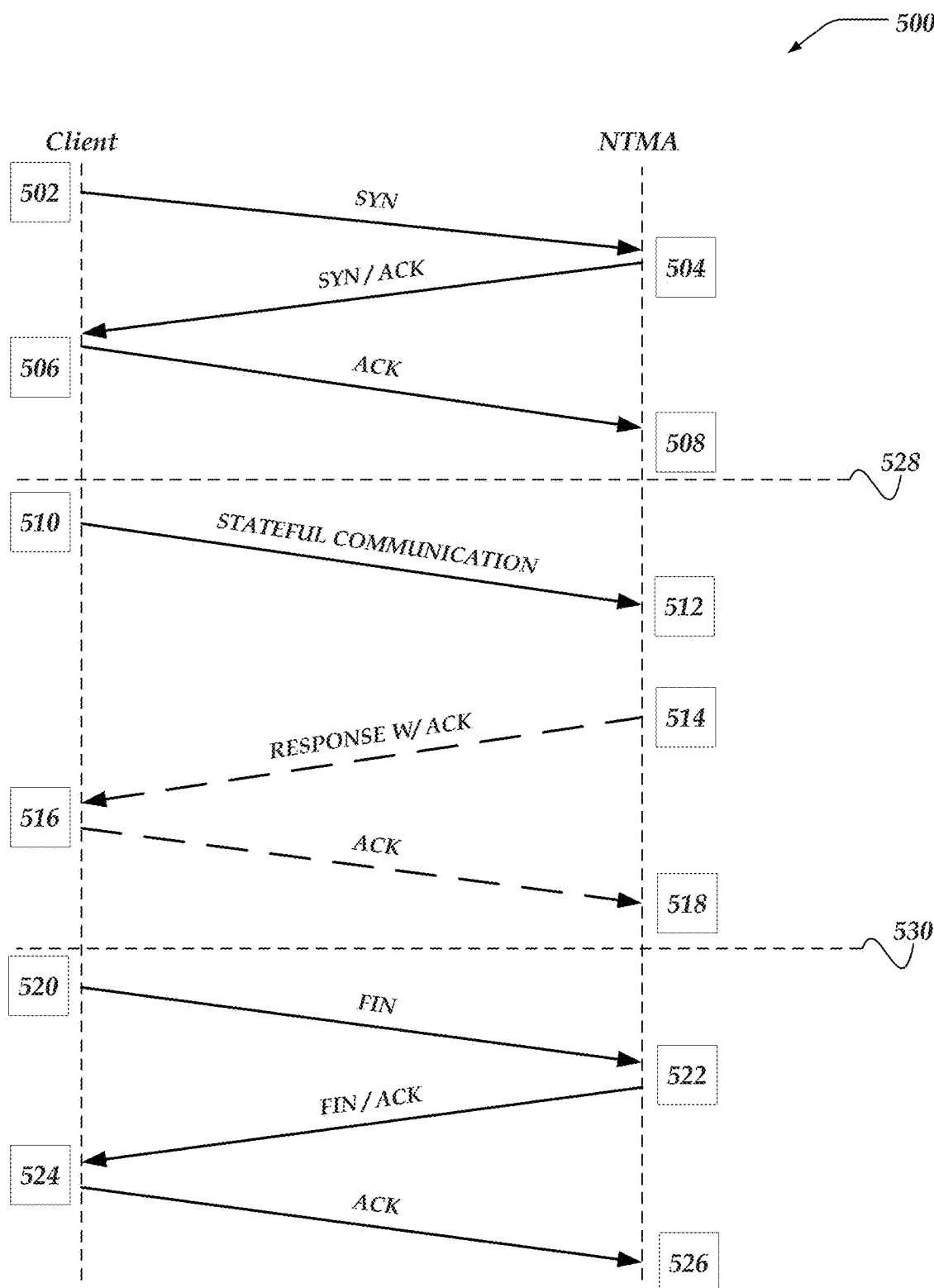
FIG. 5 illustrates a logical sequence diagram that represents an exemplary sequence for stateless communication using a stateful protocol.

FIG. 5 illustrates a logical sequence diagram that represents sequence 500 for stateless communication using a stateful protocol in accordance with one or more of the various embodiments. As described above, a NTMA, such as NTMA 408, may be arranged to monitor traffic between clients and servers, such as client computers 402-404 and DNS server computer 410, web server computer 412, application server computer 414, web server 326, or the like. In some embodiments, the network for accessing the servers may be arranged so that one or more NTMAs may monitor the network traffic associated with communications to and from the servers or applications that may be running on the servers. Sequence 500 shows a sequence of communication transactions between a client and a NTMA.

In one or more of the various embodiments, a client (e.g., a client computer) may be interested in communicating with a particular server, service, application, or the like. In one or more of the various embodiments, examples of communications that may be included in sequence 500 include requests and responses that pertain to providing web pages, applications, name service requests, or other services provided by the server to the client. Further examples include requests by the client to the server, such as data posts or the like. In some embodiments, one or more portions of one or more steps included in sequence 500 that are described below as performed by the NTMA may instead be performed by one or more other network computers, such as DNS server computer 410, web server computer 412, application server computer 414, or the like, that may be arranged for performing stateless communication using a stateful protocol.

At step 502, in one or more of the various embodiments, the client may initialize a connection with the NTMA by providing an initialization message to the NTMA. In some of the various embodiments, the initialization message may initiate a handshake with the NTMA, such as a three-way handshake. In some embodiments, the initialization message may include a value that the client generates for the connection. For example, when employing TCP, the client may provide a synchronize (SYN) packet to the NTMA that includes an initial value for a client sequence number (SEQ number).

At step 504, in one or more of the various embodiments, the NTMA may obtain the initialization message from the client and may provide additional connection information to the client. In some of the various embodiments, because the NTMA is arranged to monitor communications between clients and the server, the NTMA may obtain access to the initialization message. In some embodiments, the NTMA may be arranged to passively monitor the communication from the clients without interrupting the communication to the server. In some embodiments, the NTMA may be arranged to proxy the communication from the clients to the server by performing as a network endpoint. In such embodiments, the NTMA may be a terminating endpoint for the clients and create its own connections to the server that may be employed to forward the communication from the clients. In some embodiments, the monitoring performed by the NTMA may be transparent such that the client may be unaware that the NTMA is monitoring the client's communication with the server.

In one or more of the various embodiments, the NTMA may determine that the client intends to initiate a connection based on one or more characteristics of the initialization message, such as one or more values of one or more flags in the initialization message, the length of the initialization message being below a threshold, the initialization message lacking packet data, or the like. In some of the various embodiments, when the NTMA determines that the obtained message is an initialization message, the NTMA may generate or otherwise construct the additional connection information based on one or more characteristics of the initialization message, such as one or more values included in the initialization information (e.g., tuple information, the client SEQ number, or the like), a time of arrival of the initialization message, or the like. In some embodiments, the additional connection information may include a SYN cookie generated using various processes. For example, in some embodiments, the NTMA may apply a hash function, another cryptographic function, or the like to one or more header values included in the initialization message to generate or otherwise construct a SYN cookie or other additional connection information. In some embodiments, the NTMA may respond to the initialization message with a connection confirmation message that includes the additional connection information. For example, when employing TCP, the NTMA may provide a SYN/ACK (acknowledgement) packet to the client that includes the additional connection information (e.g., a SYN cookie) as an initial value for a NTMA SEQ number. In this example, the NTMA may increment the value of the obtained client SEQ number by one and may include the client SEQ number as an acknowledgement number (ACK number) in the SYN/ACK packet.

In one or more of the various embodiments, the NTMA may drop or discard the initialized connection after providing the additional connection information. In some of the various embodiments, the NTMA may actively drop the connection by removing one or more portions of the initialization message, the connection confirmation message, or the like from memory. In some embodiments, the NTMA may actively drop the connection by actively indicating (by setting one or more flags, other markers, or the like) that one or more portions of the initialization message, the connection confirmation message, other connection state associated with the connection, or the like are available to be overwritten in memory. In other embodiments, the NTMA may passively drop the initialized connection by ceasing to preserve the in-memory representations of one or more portions of the initialization message, the connection confirmation message, other connection state, or the like. For example, the NTMA may permit the unpreserved information to be overwritten in memory with subsequently obtained or generated information (e.g., one or more portions of, or one or more references to one or more portions of, future initialization messages, future connection confirmation messages, or the like), regardless of whether the client intends to maintain the connection. In contrast, in a conventional implementation of a stateful protocol, such as TCP, a server would preserve connection information, such as client and server sequence numbers, in memory to sustain the connection.

At step 506, in one or more of the various embodiments, the client may obtain the connection confirmation message from the NTMA and may provide an acknowledgement message directed to the server. For example, when employing TCP, the client may provide an ACK packet that includes the client SEQ number (the initial value, incremented by one). In this example, the client may increment the initial value of the obtained NTMA SEQ number by one and include the NTMA SEQ number as an ACK number.

At step 508, in one or more of the various embodiments, the NTMA may obtain the acknowledgement message from the client. In some of the various embodiments, the NTMA may determine that the obtained message lacks packet data and does not require a response based on one or more characteristics of the obtained message, such as one or more values of one or more flags in the obtained message, the length of the obtained message being below a threshold, or the like. In some embodiments, when the NTMA determines that the obtained message is an acknowledgement message or that the obtained message does not require a response, the NTMA may disregard the obtained message without verifying the obtained message.

At step 510, in one or more of the various embodiments, the client may provide a stateful communication that is a data message to the NTMA. In some of the various embodiments, the data message may include a request. In some embodiments, the data message may include connection information in a packet header that identifies the connection initialized by the client. For example, when employing TCP, the stateful communication includes the client SEQ number (the initial value, incremented by one) and also includes the NTMA SEQ number (the initial value, incremented by one) as an ACK number.

At step 512, in one or more of the various embodiments, the NTMA may obtain the data message and may provide an acknowledgement message to the client. In some of the various embodiments, the NTMA may determine that the data message includes data to provide an answer based on one or more characteristics of the data message, such as one or more values of one or more flags in the data message, the length of the data message exceeding a threshold, the data message including packet data, or the like.

In one or more of the various embodiments, the NTMA may verify the data message prior to providing a server response based on verification information. In some embodiment, the verification information may be generated based on one or more characteristics of the data message, such as one or more values included in the data message (e.g., tuple information, the client SEQ number, the ACK number, or the like), a timestamp in the data message, completeness of a request included in the data message, or the like. In some of the various embodiments, the NTMA may apply the hash function to one or more values included in the data message to provide candidate validation information. In some embodiments, the NTMA may modify the one or more values prior to applying the hash function to the one or more modified values to provide the candidate validation information.

In some embodiments, the NTMA may verify the data message based on a comparison of the candidate validation information to verification information based on one or more other values included in the data message. For example: the NTMA may decrement the value of the obtained client SEQ number by one; may apply the hash function to the decremented value of the obtained client SEQ number to provide the candidate validation information; may decrement the value of the obtained ACK number; may compare the candidate validation information to the decremented value of the obtained ACK number, and, if the candidate validation information matches the decremented value of the obtained ACK number; and may verify the data message.

In one or more of the various embodiments, NTMA may be arranged to reject the data messages that span more than one packet. Accordingly, in some embodiments, some clients may be configured to resend the data message with an increased length that enables the request to fit in a single packet.

In one or more of the various embodiments, the NTMA may modify one or more values provided in the data message and may include the one or more modified values in the acknowledgement message. For example, when employing TCP, the NTMA may increment the value of the obtained client SEQ number by a length of the packet data (e.g., the number of bytes included in the packet data), may include the client SEQ number in the data message as an ACK number, and may include the obtained ACK number included in the data message as the NTMA SEQ number.

In one or more of the various embodiments, the NTMA may choose to initiate the close of the client's connection by including various indicators in the message, including flags, additional fields, or the like.

In one or more of the various embodiments, the NTMA may remove one or more portions of the data message, the acknowledgement message, or the like from memory. In some of the various embodiments, the NTMA may indicate (by setting one or more flags, other markers, or the like) that one or more portions of the data message, the acknowledgement message, or the like as available to be overwritten in memory. In other embodiments, the NTMA may cease to preserve the in-memory representation of one or more portions of the data message, the acknowledgement message, or the like. For example, the NTMA may permit the unpreserved information to be overwritten in memory with subsequently obtained or generated information (e.g., one or more portions of, or one or more references to one or more portions of, a future data message, a future acknowledgement message, or the like), regardless of whether the client intends to maintain a connection. In contrast, in a conventional implementation of TCP, a server would preserve connection information, such as client and server sequence numbers (or initial values thereof) in memory to sustain the connection.

In one or more of the various embodiments, the NTMA may inspect the data message to determine if the packet data includes a request. In some of the various embodiments, if the packet data includes a full request, the NTMA may provide the acknowledgement message; otherwise, if the packet data includes a query request, the NTMA may add the acknowledgement message to its response, such as the response discussed below with regard to step 514.

At step 514, in one or more of the various embodiments, the NTMA may obtain the packet data and provide a response to the client.

For example, when employing TCP, the NTMA may include the client SEQ number (incremented by a length of the packet data in the data message) as an ACK number and may include the obtained ACK number as the NTMA SEQ number. In one or more of the various embodiments, the NTMA may be arranged to include a termination message in the response to enable the client to close its side of the connection. This enables the NTMA to support application protocols that require a server to send a termination messages with its response. For example, when employing TCP, the NTMA may be arranged to send a FIN message that follows the response.

At step 516, in one or more of the various embodiments, the client may obtain the response and may provide an acknowledgement message. In some of the various embodiments, the client may modify one or more values included in the response and may include the one or more modified values in the acknowledgement message. For example, when employing TCP, the client may include the client SEQ number. In this example, the client may increment the NTMA SEQ number by a length of the packet data in the response and may include the NTMA SEQ number as an ACK number.

In one or more of the various embodiments, the client may be enabled to choose to initiate the closing of its stateful connection by including indicators, such as, one or more flags, one or more additional fields, or the like, with the acknowledgement message.

At step 518, in one or more of the various embodiments, the NTMA may obtain the acknowledgement message. In some of the various embodiments, the NTMA may determine that the obtained message lacks packet data and does not require a response based on one or more characteristics of the obtained message, such as one or more values of one or more flags in the obtained message, the length of the obtained message being below a threshold, or the like. In some embodiments, when the NTMA determines that the obtained message is an acknowledgement message or that the obtained message does not require a response, the NTMA may disregard the obtained message without verifying the obtained message.

At step 520, in one or more of the various embodiments, the client may provide a connection termination message indicating the communication session is complete to the NTMA. For example, when employing TCP, the client may include the client SEQ number and may include the NTMA SEQ number as an ACK number in a final packet (FIN packet). Note, in some embodiments, the NMTA may be arranged to combine this step (step 520) with step 516.

At step 522, in one or more of the various embodiments, the NTMA may obtain the connection termination message and may provide a final acknowledgement message to the client. In some of the various embodiments, the NTMA may determine that the obtained message is a connection termination message based on one or more characteristics of the obtained message, such as one or more values of one or more flags in the obtained message, the length of the obtained message being below a threshold, the obtained message lacking packet data, or the like. In some embodiments, the NTMA may verify the connection termination prior to providing the final acknowledgement message based on one or more characteristics of the connection termination, such as discussed above with regard to step 512. Alternatively, the NTMA may provide the acknowledgement message without verifying the connection termination message. In some embodiments, the NTMA may include one or more portions of the connection termination message in the acknowledgement message. For example, when employing TCP, the NTMA may include the obtained client SEQ number as an ACK number and may include the obtained ACK number as the TCM SEQ number in a FIN/ACK packet.

In one or more of the various embodiments, the NTMA may remove one or more portions of the connection termination message, the final acknowledgement message, or the like from memory. In some of the various embodiments, the NTMA may indicate (by setting one or more flags, other markers, or the like) that one or more portions of the connection termination message, the final acknowledgement message, or the like as available to be overwritten. In other embodiments, the NTMA may cease to preserve one or more portions of the connection termination message, the final acknowledgement message, or the like. For example, the NTMA may permit the unpreserved information to be overwritten with subsequently obtained or generated information (e.g., one or more portions of, or one or more references to one or more portions of, the connection termination message, the final acknowledgement message, or the like), regardless of whether the client confirms receipt of the final acknowledgement message.

At step 524, the client may obtain the final acknowledgement message and may provide an acknowledgement message to the NTMA. In some of the various embodiments, the client may include one or more portions of the validation information in the acknowledgement message. For example, when employing TCP, the client may include the TCM SEQ number as an ACK number and may include the client SEQ number in an ACK packet.

At step 526, in one or more of the various embodiments, the NTMA may obtain the acknowledgement message. In some of the various embodiments, the NTMA may determine that the obtained message lacks packet data and does not require a response based on one or more characteristics of the obtained message, such as one or more values of one or more flags in the obtained message, the length of the obtained message being below a threshold, or the like. In some embodiments, when the NTMA determines that the obtained message is an acknowledgement message or that the obtained message does not require a response, the NTMA may disregard the obtained message without verifying or validating the obtained message.

Accordingly, in one or more of the various embodiments, sequence 500 can be broken into three or more phases: i) an initiation phase, ii) a service phase, and iii) a termination phase. In some of the various embodiments, the initiation phase includes one or more of the steps shown above dashed line 528, the service phase includes one or more of the steps shown between dashed line 528 and dashed line 530, and the termination phase includes one or more of the steps shown below dashed line 530. In some embodiments, more or fewer steps may be included in each phase. In some embodiments, one or more of the phases of sequence 500 can be omitted. In some embodiments, the NTMA may not preserve information provided to or obtained from the client from one phase of sequence 500 to the next phase of sequence 500. In some cases, the NTMA may not preserve information provided to or obtained from the client from one step in sequence 500 to the next step in sequence 500. Thus, in some embodiments, the NTMA may determine various information to provide to the client, to verify obtained packets, or the like based on various values included in packets obtained from the client, such as SEQ numbers, ACK numbers, or the like. In some embodiments, the NTMA may execute one or more traffic management policies, rules, programs, or the like (e.g., policy rules 314) on the monitored traffic to determine the various values, verify the packets obtained from the client, or the like. Accordingly, in one or more of the various embodiments, the client may be maintaining the connection state information rather than the NTMA.

Figure 6:
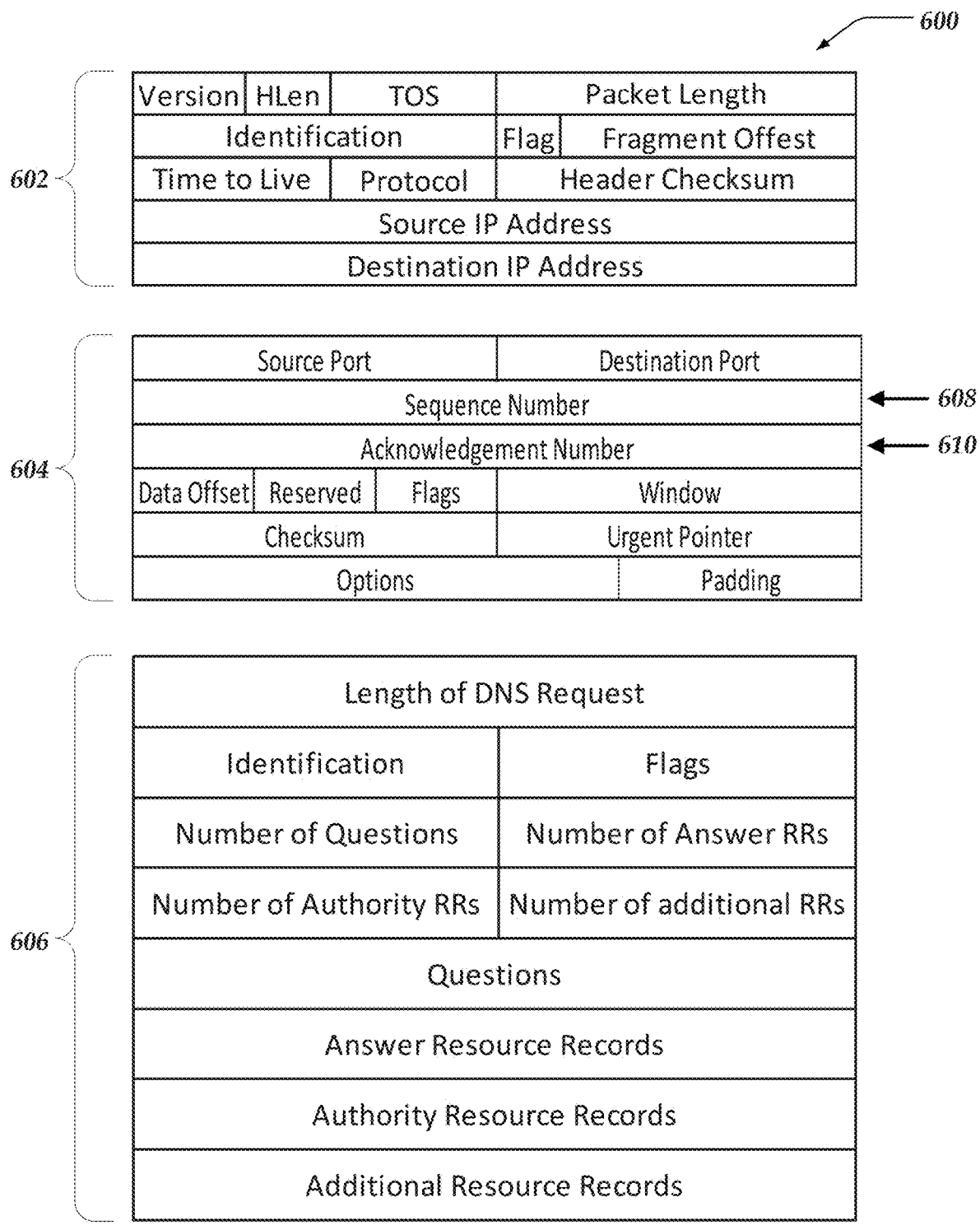
FIG. 6 shows components of an exemplary DNS communication packet.

FIG. 6 illustrates components of a communication using packet 600 that is in accordance with one or more of the various embodiments. In some embodiments, packet 600 is an example of a DNS packet format that may be used for name service queries and replies. In some embodiments, name service communication may be conducted using IP and TCP. Accordingly, packet 600 may include IP header 602, TCP header 604, and DNS message 606. In some embodiments, SEQ number 608 may include or otherwise represent a sequence number associated with an endpoint that provided packet 600. In some embodiments, ACK number 610 may include or otherwise represent a sequence number associated with an endpoint that obtains the packet 600. In some embodiments, DNS message 606 may be included in a data portion of a TCP packet.

Generalized Operations

Figure 7:
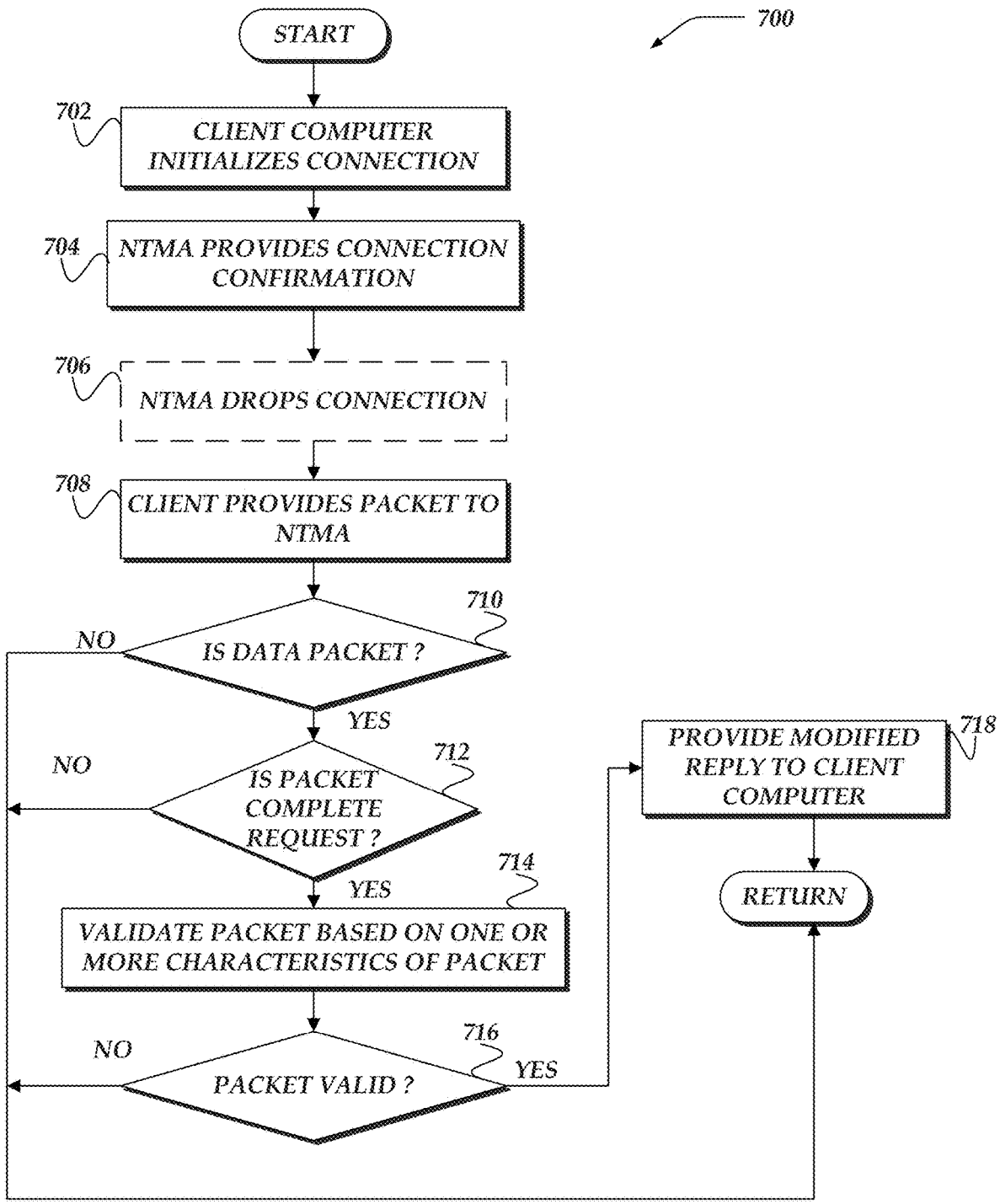
FIG. 7 illustrates an overview flowchart of an exemplary process for stateless communication using a stateful protocol.
Figure 8:
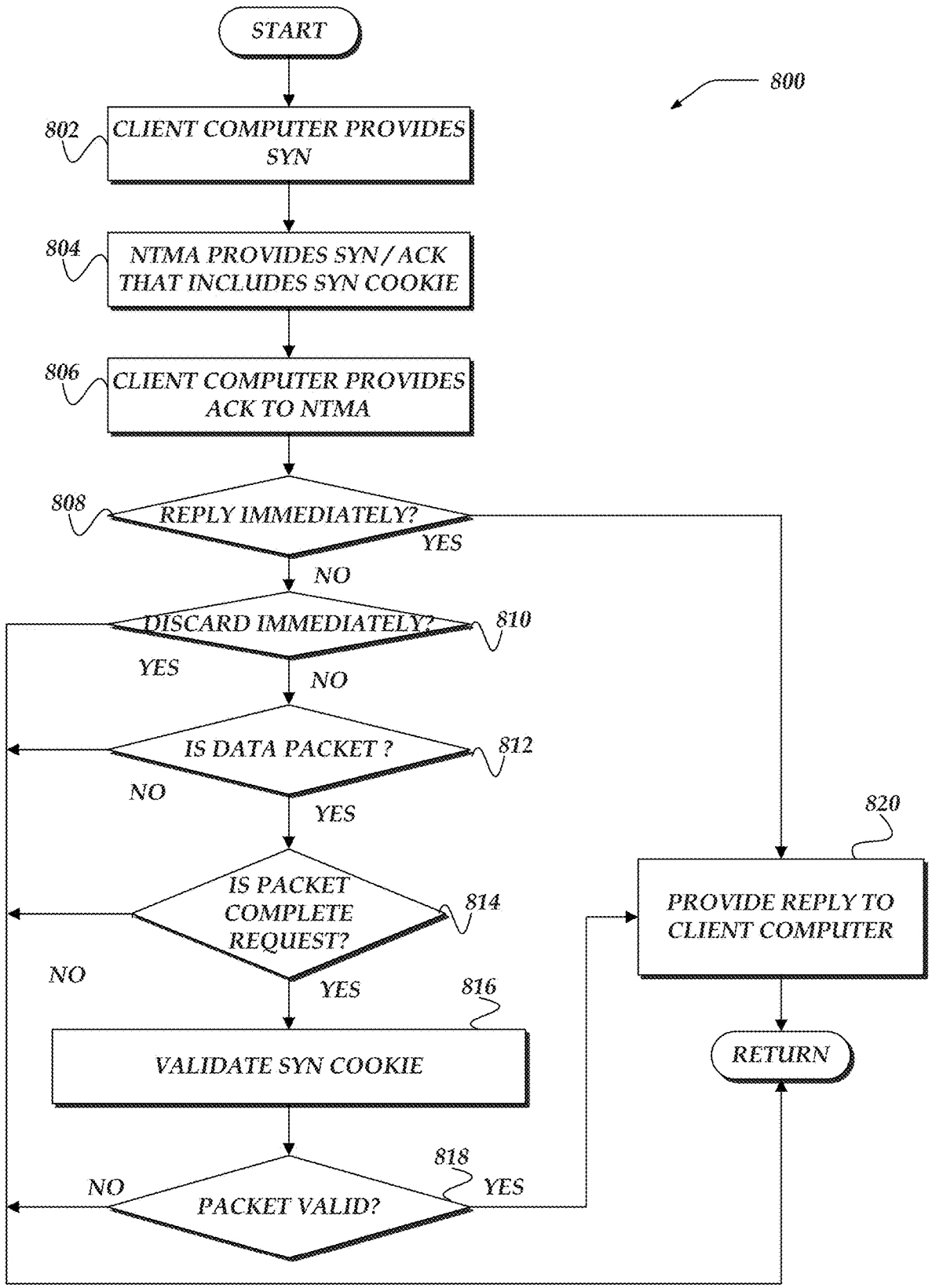
FIG. 8 shows an overview flowchart of an exemplary process for stateless communication using Transmission Control Protocol (TCP)
Figure 9:
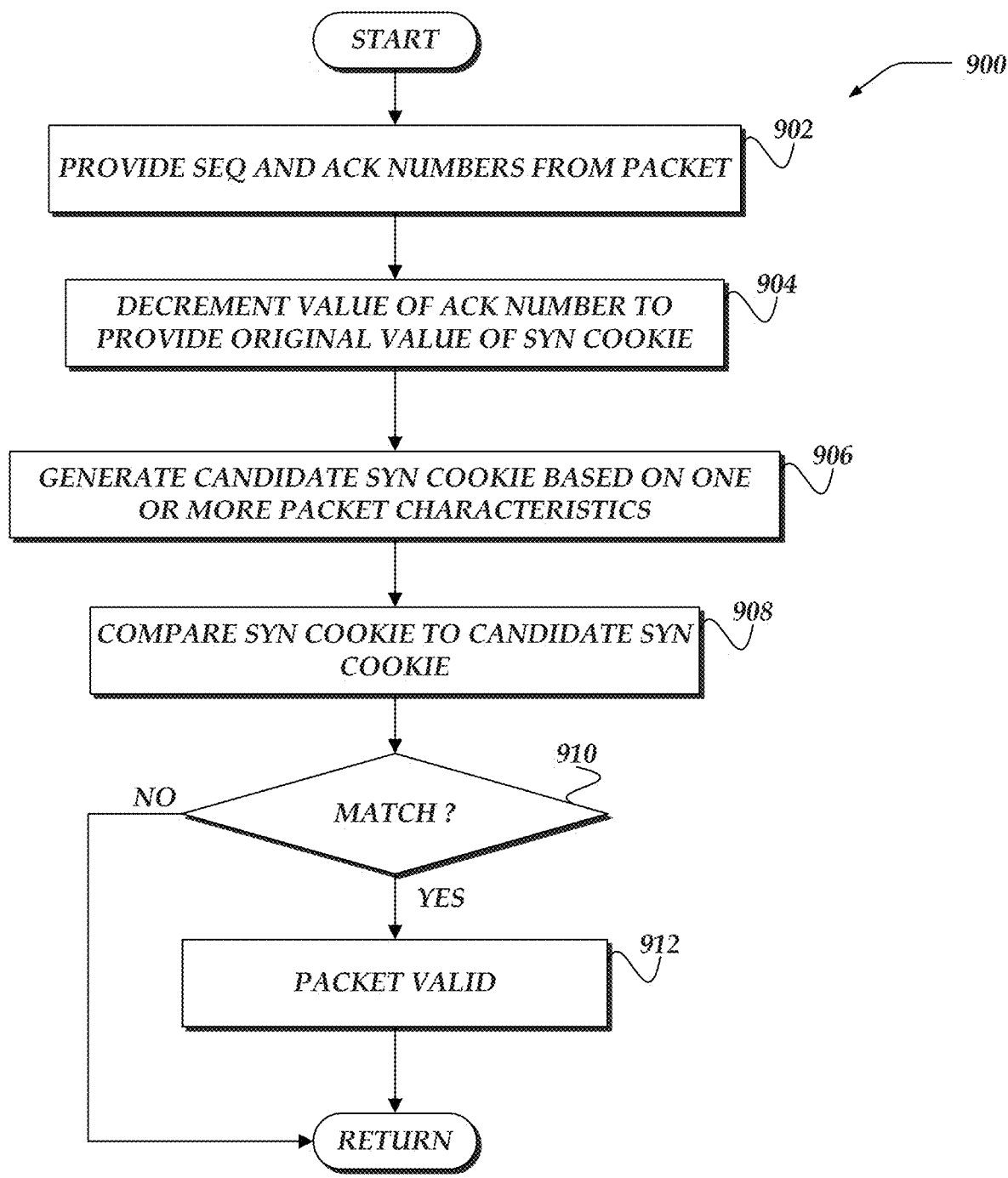
FIG. 9 illustrates an overview flowchart of an exemplary process for validating a packet in stateless communication using TCP.

FIGS. 7-9 represent the generalized operations for systems and methods for stateless communication using a stateful protocol in accordance with one or more of the various embodiments. In one or more of the various embodiments, processes 700, 800, and 900 as described in FIGS. 7-9 may be implemented by or executed on a single network traffic management apparatus (NTMA) or network computer, such as network computer 300 of FIG. 3. In other embodiments, these processes or portions thereof may be implemented by or executed on a plurality of network computers, such as network computer 300 of FIG. 3, client computer 200 of FIG. 2, or the like. Also, in some embodiments, these processes or portions thereof may be implemented by or executed on one or more processors of a NTMA, name service device, or network computer. However, embodiments are not so limited, and various combinations of network computers, client computers, processors, virtual machines, NTMAs, name service computers, name service devices, or the like may be utilized. Further, in one or more of the various embodiments, the processes described in conjunction with FIGS. 7-9 may be operative in network traffic management apparatuses, systems, or architectures, such as those described in conjunction with FIGS. 1-6 and 10.

FIG. 7 illustrates an overview flowchart of process 700 for stateless communication using a stateful protocol in accordance with one or more of the various embodiments. As described above, a network traffic management apparatus (NTMA) may be arranged to intercept a client's communication to a server and perform as a connection endpoint. In other embodiments, the NTMA may be arranged to passively monitor the client's communication with the server. In other embodiments, one or more portions of one or more blocks included in process 700 that are described below as performed by the NTMA may instead be performed by one or more other network computers, such as DNS server computer 410, web server computer 412, application server computer 414, or the like, that may be arranged for performing stateless communication using a stateful protocol. In some embodiments, one or more portions of one or more blocks included in process 700 that are described below as performed by the NTMA may be performed by a data flow segment, such as data flow segment 366. In some embodiments, one or more portions of one or more blocks included in process 700 that are described below as performed by the NTMA may be performed by a control segment, such as control segment 324.

After a start block, at block 702, in one or more of the various embodiments, a client may initialize a connection with the NTMA. In some of the various embodiments, the client may provide an initialization message to the NTMA. In some embodiments, the initialization message may include connection information associated with the stateful protocol. For example, when employing TCP, the initialization message may include a client sequence number (SEQ number).

At block 704, in one or more of the various embodiments, the NTMA may provide one or more acknowledgement messages comprising a protocol handshake in response to the client based on the initialization message. In some of the various embodiments, the NTMA may generate or otherwise construct validation information to include in the acknowledgement message based on one or more characteristics of the initialization message, such as one or more values included in the initialization information (e.g., tuple information, the client SEQ number, or the like), a time of arrival of the initialization message, or the like. For example, when employing TCP, the NTMA may generate or otherwise construct a special purpose SYN cookie based on the obtained client SEQ number using various processes and may include the SYN cookie as a NTMA SEQ number in the acknowledgement message. For example, in some embodiments, the NTMA may apply a hash function, another cryptographic function, or the like to one or more header values included in the initialization message to generate or otherwise construct a SYN cookie or other connection information.

In some embodiments, one or more portions of the SYN cookie may include a time stamp based on one or more times, such as a time of arrival of the initialization message, time of providing the acknowledgement message, or the like. In this example, the NTMA may increment the value of the client SEQ number by one and may include the client SEQ number as an ACK number in the acknowledgement message.

At block 706, in one or more of the various embodiments, the NTMA may optionally drop the connection. In some of the various embodiments, dropping the connection may be considered optional because, instead of actively dropping the connection, the NTMA may passively drop the connection.

In some of the various embodiments, the NTMA may actively drop the connection by removing one or more portions of the initialization message, the connection confirmation message, other connection state, or the like from memory. In some embodiments, the NTMA may actively drop the connection by actively indicating (by setting one or more flags, other markers, or the like) that one or more portions of the initialization message, the connection confirmation message, other connection state associated with the connection, or the like are available to be overwritten in memory.

In other embodiments, the NTMA may passively drop the initialized connection by ceasing to preserve the in-memory representation of one or more portions of the initialization message, the connection confirmation message, other connection state associated with the connection, or the like. For example, the NTMA may permit the unpreserved information to be overwritten in memory with subsequently obtained or generated information (e.g., one or more portions of, or one or more references to one or more portions of, future initialization messages, future connection confirmation messages, or the like), regardless of whether the client intends to maintain the connection. In contrast, in a conventional implementation of a stateful protocol, such as TCP, a server would preserve connection information, such as client and server SEQ numbers, in memory to sustain the connection.

At block 708, in one or more of the various embodiments, the client may provide a packet to the NTMA. In some of the various embodiments, the packet may include the connection information that includes the validation information. For example, when employing TCP, the packet may include the client SEQ number (the initial value, incremented by one). In this example, the client may have incremented the value of the NTMA SEQ number by one and include the NTMA SEQ number as an ACK number in the packet.

At decision block 710, in one or more of the various embodiments, the NTMA may determine if the packet obtained from the client is a data packet. In some of the various embodiments, the NTMA may determine that the obtained packet includes data to provide to a server based on one or more characteristics of the obtained packet, such as one or more values of one or more flags in the obtained packet, the length of the obtained packet exceeding a threshold, the obtained packet including packet data, or the like. Accordingly, in some embodiments, if the packet is a data packet, process 700 may proceed to decision block 712; otherwise, control may return to a calling process.

Also, in one or more of the various embodiments, if the packet is not a data packet, the NTMA may additionally determine if the packet is a connection initialization message or a connection termination message. In some of the various embodiments, if the packet is neither a connection initialization message nor a connection termination message, control may return to a calling process; otherwise, the NTMA may provide the appropriate response as discussed above, such as a response that includes validation information, a response that acknowledges termination of the connection, or the like. In some embodiments, after providing the appropriate response, control may be returned to a calling process.

At decision block 712, the NTMA may determine if the data packet is a complete request. In some of the various embodiments, if the data packet is not a complete request (e.g., the request spans multiple packets), control may be returned to a calling process; otherwise, process 700 may proceed to block 714. In some embodiments, the NTMA may determine that the data packet includes a complete request based on one or more characteristics of the data packet, such as one or more values of one or more flags in the data packet, the length of the data packet exceeding a threshold, other header values included in the data packet, or the like.

Note, in some embodiments, some clients may be configured to resend requests using a longer packet length that may enable the request to fit in a single packet.

At block 714, in one or more of the various embodiments, the NTMA may validate the data packet based on verification information included in data packet, such as one or more values included in the data packet (e.g., tuple information, client SEQ number, ACK number, or the like), a timestamp in the data packet, other header values, or the like. In some of the various embodiments, the NTMA may provide candidate validation information using various processes based on one or more values provided in the data packet. For example, in some embodiments, the NTMA may apply a hash function, another cryptographic function, or the like to the one or more verification values provided in the data packet, such as the client SEQ number or the like. In some embodiments, the NTMA may modify the one or more values and may provide the candidate validation information based on the one or more modified values.

In some embodiments, the NTMA may validate the data packet based on a comparison of the candidate validation information to one or more other values provided in the data packet.

At decision block 716, in one or more of the various embodiments, the NTMA may determine if the data packet is valid based on the validation of the data packet at block 714. In some of the various embodiments, if the data packet is not valid, control may be returned to a calling process; otherwise, process 700 may proceed to block 718.

At block 718, in one or more of the various embodiments, the NTMA may provide the modified reply packet to the client. In some of the various embodiments, the server may provide the modified reply packet to the client without intervention by the NTMA. In one or more of the various embodiments, the NTMA or the server may choose to signal the client to close its connection by including one or more indicators, such as flags, attributes, or the like, in the response.

In one or more of the various embodiments, the NTMA may remove one or more portions of the data packet, the reply packet, other connection state information, or the like from memory. In some of the various embodiments, the NTMA may indicate (by setting one or more flags, other markers, or the like) that one or more portions of the data packet, the reply packet, other connection state information, or the like as available to be overwritten in memory. In other embodiments, the NTMA may cease to preserve the in-memory representation of one or more portions of the data packet, the reply packet, other connection state information, or the like. For example, the NTMA may permit the unpreserved information to be overwritten in memory with subsequently obtained or generated information (e.g., one or more portions of, or one or more references to one or more portions of, a future data packet, a future reply packet, or the like), regardless of whether the client intends to maintain a connection. In contrast, in a conventional implementation of TCP, a server would preserve connection information, such as client and server sequence numbers (or initial values thereof), in memory to sustain the connection. Accordingly, in one or more of the various embodiments, the client may be maintaining the connection state information rather than the NTMA.

Next, control may be returned to a calling process.

FIG. 8 shows an overview flowchart of process 800 for stateless communication using Transmission Control Protocol (TCP) in accordance with one or more of the various embodiments. As described above, a network traffic management apparatus (NTMA) (e.g., NTMA 408) may be arranged to intercept a client's communication to a server and perform as a connection endpoint. In other embodiments, the NTMA may be arranged to passively monitor the client's communication with the server. In other embodiments, one or more portions of one or more blocks included in process 800 that are described below as performed by the NTMA may instead be performed by one or more other network computers, such as DNS server computer 410, web server computer 412, application server computer 414, or the like, that may be arranged for performing stateless communication using a stateful protocol. In some embodiments, one or more portions of one or more blocks included in process 800 that are described below as performed by the NTMA may be performed by a data flow segment, such as data flow segment 366. In some embodiments, one or more portions of one or more blocks included in process 800 that are described below as performed by the NTMA may be performed by a control segment, such as control segment 324.

After a start block, at block 802, in one or more of the various embodiments, a client may provide a synchronize (SYN) packet to the NTMA to initialize a connection. In some of the various embodiments, the SYN packet may include a client sequence number (SEQ number).

At block 804, in one or more of the various embodiments, the NTMA may provide a synchronize/acknowledgement (SYN/ACK) packet to the client based on the SYN packet. In some of the various embodiments, the NTMA may generate or otherwise construct validation information, such as, a NTMA SEQ number that includes a SYN cookie using various processes. For example, in some embodiments, the NTMA may apply a hash function, another cryptographic function, or the like, to one or more header values provided in the SYN packet, such as tuple information, the client SEQ number, or the like. In some embodiments, the NTMA may generate or otherwise construct the SYN cookie based on one or more characteristics of the initialization message, such as one or more values provided in the SYN packet (e.g., tuple information, the client SEQ number, or the like), a time of arrival of the SYN packet, or the like. In some embodiments, the NTMA may increment the value of the obtained client SEQ number by one and include the client SEQ number as an ACK number in the SYN/ACK packet.

At block 806, in one or more of the various embodiments, the client may provide an acknowledgement (ACK) packet to the NTMA. In some of the various embodiments, the ACK packet may include the client SEQ number (the initial value of the client SEQ number, incremented by one). In some embodiments, the client may increment the value of the NTMA SEQ number by one and include the NTMA SEQ number as an ACK number in the ACK packet. In some embodiments, the NTMA may disregard ACK packets.

At decision block 808, in one or more of the various embodiments, if the NTMA determines that a reply to the client should be provided immediately, control may flow to block 820; otherwise, control may flow to decision block 810. In one or more of the various embodiments, the NMTA may be arranged to immediately reply to (e.g., acknowledge) bare FIN packets. In some embodiments, such replies may be FIN/ACK packets.

At decision block 810, in one or more of the various embodiments, if the NTMA determines that network packets provided by the client should be immediately discarded, the packet(s) may be discarded and control may be returned to a calling process. In one or more of the various embodiments, the NTMA may be arranged to discard bare ACK packets rather than expend further resources to validate or otherwise process such packets.

At decision block 812, in one or more of the various embodiments, the NTMA may determine if the packet obtained from the client is a data packet. In some of the various embodiments, the NTMA may determine that the obtained packet includes data to provide to a server based on one or more characteristics of the obtained packet, such as one or more values of one or more flags provided in the obtained packet, the length of the obtained packet exceeding a threshold, the obtained packet including packet data, or the like. In some embodiments, if the packet is not a data packet, control may return to a calling process; otherwise, process 800 may proceed to decision block 814.

At decision block 814, the NTMA may determine if the data packet is a complete request. In some of the various embodiments, if the data packet is not a complete request (e.g., the request spans multiple packets), control may be returned to a calling process; otherwise, process 800 may proceed to block 816. In some embodiments, the NTMA may determine that the data packet includes data to provide a response based on one or more characteristics of the data packet, such as one or more values of one or more flags in the data packet, the length of the data packet exceeding a threshold, other head values included in the data packet, or the like.

At block 816, in one or more of the various embodiments, the NTMA may validate a SYN cookie based on verification information produced from one or more characteristics of the data packet, such as one or more values included in the data packet (e.g., tuple information, client SEQ number, ACK number, or the like), a timestamp in the data packet, other header values, or the like. In some of the various embodiments, the NTMA provide a candidate SYN cookie using various processes based on one or more values included in the data packet. For example, in some embodiments, the NTMA may provide the verification information by applying a hash function, another cryptographic function, or the like to the one or more values provided in the data packet, such as tuple information, the client SEQ number, the ACK number, a timestamp in the data packet, other header values, or the like. In some embodiments, the NTMA may modify the one or more values prior to applying the hash function to the one or more modified values to provide the candidate SYN cookie.

In some embodiments, the NTMA may validate the data packet based on a comparison of the candidate SYN cookie to the verification information produced from one or more other values included in the data packet. For example, the NTMA may perform the following actions: decrementing the value of the obtained client SEQ number; applying the hash function to the client SEQ number to generate or otherwise construct the candidate SYN cookie; incrementing the value of the candidate SYN cookie by one (or decrement the value of the obtained ACK number by one); comparing the candidate SYN cookie to the ACK number; and, if the candidate SYN cookie matches the obtained ACK number, validating the candidate SYN cookie.

At decision block 818, in one or more of the various embodiments, the NTMA may determine if the data packet is valid based on the validation of the SYN cookie at block 816. In some of the various embodiments, if the data packet is not valid, control may be returned to a calling process; otherwise, process 800 may proceed to block 820. In some embodiments, the NTMA may determine that the data packet is valid when the candidate validation information matches the ACK number. In some embodiments, the NTMA may determine that the data packet is invalid when the candidate validation information fails to match the ACK number.

At block 820, in one or more of the various embodiments, the NTMA may provide a reply to the client. In some of the various embodiments, the NTMA may include the reply NTMA SEQ value and the reply ACK value as header values in the reply. In some embodiments, the reply is an ACK packet. In other embodiments, if the data packet obtained from the client is a push request, the reply is an ACK packet; otherwise, the reply is a data packet that includes the one or more portions of the information, the service, or the like that the client requested. In some embodiments, the server may provide one or more reply packets (e.g., a single reply packet, a sequence of reply packets, a stream of reply packets, or the like) that include the reply NTMA SEQ value and the reply ACK value.

In one or more of the various embodiments, the NTMA may remove one or more portions of the data packet, the reply packet, or the like from memory. In some of the various embodiments, the NTMA may indicate (by setting one or more flags, other markers, or the like) that one or more portions of the data packet, the reply packet, or the like as available to be overwritten in memory. In other embodiments, the NTMA may cease to preserve the in-memory representations of one or more portions of the data packet, the reply packet, or the like. For example, the NTMA may permit the unpreserved information to be overwritten in memory with subsequently obtained or generated information (e.g., one or more portions of, or one or more references to one or more portions of, a future data packet, a future reply packet, or the like), regardless of whether the client intends to maintain a connection. In contrast, in a conventional implementation of TCP, a server would preserve connection information, such as client and server sequence numbers (or initial values thereof), in memory to sustain the connection. Accordingly, in one or more of the various embodiments, the client may be maintaining the connection state information rather than the NTMA.

Further, in one or more of the various embodiments, the NTMA may be arranged to send the client a FIN messages. Accordingly, in one or more of the various embodiments, the NTMA may be arranged to include a termination message in the response to enable the client to close its side of the connection. This enables the NTMA to support application protocols that require a server to send a termination messages with its response. For example, when employing TCP, the NTMA may be arranged to send a FIN message the follows the reply.

Likewise, in one or more of the various embodiments, if the packet sent by the client includes a FIN along with other request data, the NTMA may be arranged to include a FIN/ACK with its reply to the client.

Next, control may be returned to a calling process.

FIG. 9 illustrates an overview flowchart of process 900 for stateless validation of a Transmission Control Protocol (TCP) packet in accordance with one or more of the various embodiments. As described above, a network traffic management apparatus (NTMA) may be arranged to intercept a client's communication to a server and perform as a connection endpoint. In other embodiments, the NTMA may be arranged to passively monitor the client's communication with the server. In other embodiments, one or more portions of one or more blocks included in process 900 that are described below as performed by the NTMA may instead be performed by one or more other network computers, such as DNS server computer 410, web server computer 412, application server computer 414, or the like, that may be arranged for performing stateless communication using a stateful protocol. In some of the various embodiments, process 900 may correspond to one or more portions of one or more of blocks 714, 716, 816, or 818 in process 700 and process 800 respectively. In some embodiments, one or more portions of one or more blocks included in process 900 that are described below as performed by the NTMA may be performed by a data flow segment, such as data flow segment 366. In some embodiments, one or more portions of one or more blocks included in process 900 that are described below as performed by the NTMA may be performed by a control segment, such as control segment 324.

After a start block, at block 902, in one or more of the various embodiments, the NTMA may obtain a sequence (SEQ) number and an acknowledgement (ACK) number provided in a packet obtained from a client.

At block 904, in one or more of the various embodiments, the NTMA may decrement the value of the obtained ACK number by one to provide an original value of a SYN cookie, such as the original value of a NTMA SEQ number. For example, if the ACK sequence number is 010745, the NTMA may be arranged to provide 010744 as the original value of the SYN Cookie. Accordingly, in this example, the value 010744 may be expected to match the SYN cookie value (e.g., the validation information) that was provided as the original NTMA sequence number provided during the handshake with the client.

At block 906, in one or more of the various embodiments, the NTMA may generate or otherwise construct a value using the same steps used to create the original SYN cookie as performed during the handshake—providing the verification information. Accordingly, a candidate SYN cookie (e.g., the candidate validation information) may be generated or otherwise constructed using various processes applied to one or more packet header values of the TCP packet, such as the obtained SEQ number or the like, timestamp value, or the like. For example, in some of the various embodiments, the NTMA may apply a hash function, another cryptographic function, or the like to the one or more packet header values to generate or otherwise construct a candidate SYN cookie value to compare to the SYN cookie generated or otherwise constructed at block 904. In some embodiments, the NTMA may decrement the value of the obtained SEQ number by one and may apply the hash function to the SEQ number to generate or otherwise construct the candidate SYN cookie. For example, a hash of various header values may produce a candidate SYN cookie value 010744.

At block 908, in one or more of the various embodiments, the NTMA may compare one or more portions of the SYN cookie to one or more portions of the candidate SYN cookie. In some embodiments, instead of decrementing the obtained ACK number to provide the SYN cookie, the NTMA may increment the value of the candidate SYN cookie by one and may compare the candidate SYN cookie to the obtained ACK number.

At decision block 910, in one or more of the various embodiments, the NTMA may determine if the comparison provides a match. In some of the various embodiments, if the candidate SYN cookie equals the SYN cookie, process 900 may proceed to block 912; otherwise, control may be returned to a calling process.

For example, if the decremented ACK sequence number (e.g., SYN cookie) is 010744 and the value produced from the packet headers (e.g., candidate SYN cookie) is 010744, the packet may be considered validated. Otherwise, if there is a mismatch the packet may be considered to be invalid.

At block 912, the NTMA may determine that the obtained packet is valid. In some of the various embodiments, the NTMA may execute one or more rules based on the validity of the obtained packet (e.g., policy rules 314). In some embodiments, the NTMA may provide a reply (e.g., an acknowledgement (ACK) packet, a finish/acknowledgement (FIN/ACK) packet, or the like) to the client. In other embodiments, where process 900 is performed by one or more servers that provide information, services, or the like to the client, the one or more servers may provide or otherwise instantiate the information, services, or the like. For example, the NTMA may be arranged to compute a new sequence number based on the number of bytes included in the packet. Accordingly, in this example, if the packet size in 800 bytes the NTMA may provide a sequence number of 010745+800=011545 to help the client confirm that the transmission was successful.

Next, control may be returned to a calling process.

It will be understood that each block of the flowchart illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions execute on the processor to provide steps for implementing the actions specified in the flowchart block or blocks. The computer program instructions may also cause one or more of the operational steps shown in the blocks of the flowcharts to be performed in parallel. Moreover, some of the steps may also be performed across more than one processor, such as might arise in a multi-processor computer system. In addition, one or more blocks in the flowchart illustration may also be performed concurrently with another one or more blocks, or even in a different sequence than illustrated without departing from the scope or spirit of the invention.

Additionally, one or more steps or blocks may be implemented using embedded logic hardware, such as an Application Specific Integrated Circuit (ASIC), Field Programmable Gate Array (FPGA), Programmable Array Logic (PAL), or the like, instead of a computer program. The embedded logic hardware may directly execute embedded logic to perform some or all of the actions in one or more steps or blocks. Also, in one or more embodiments (not shown in the figures), some or all of the actions of one or more of the steps or blocks may be performed by a hardware microcontroller instead of a CPU. In one or more embodiments, the microcontroller may directly execute its own embedded logic to perform actions and access its own internal memory and its own external Input and Output Interfaces (e.g., hardware pins or wireless transceivers) to perform actions, such as System On a Chip (SOC) or the like.

Figure 10:
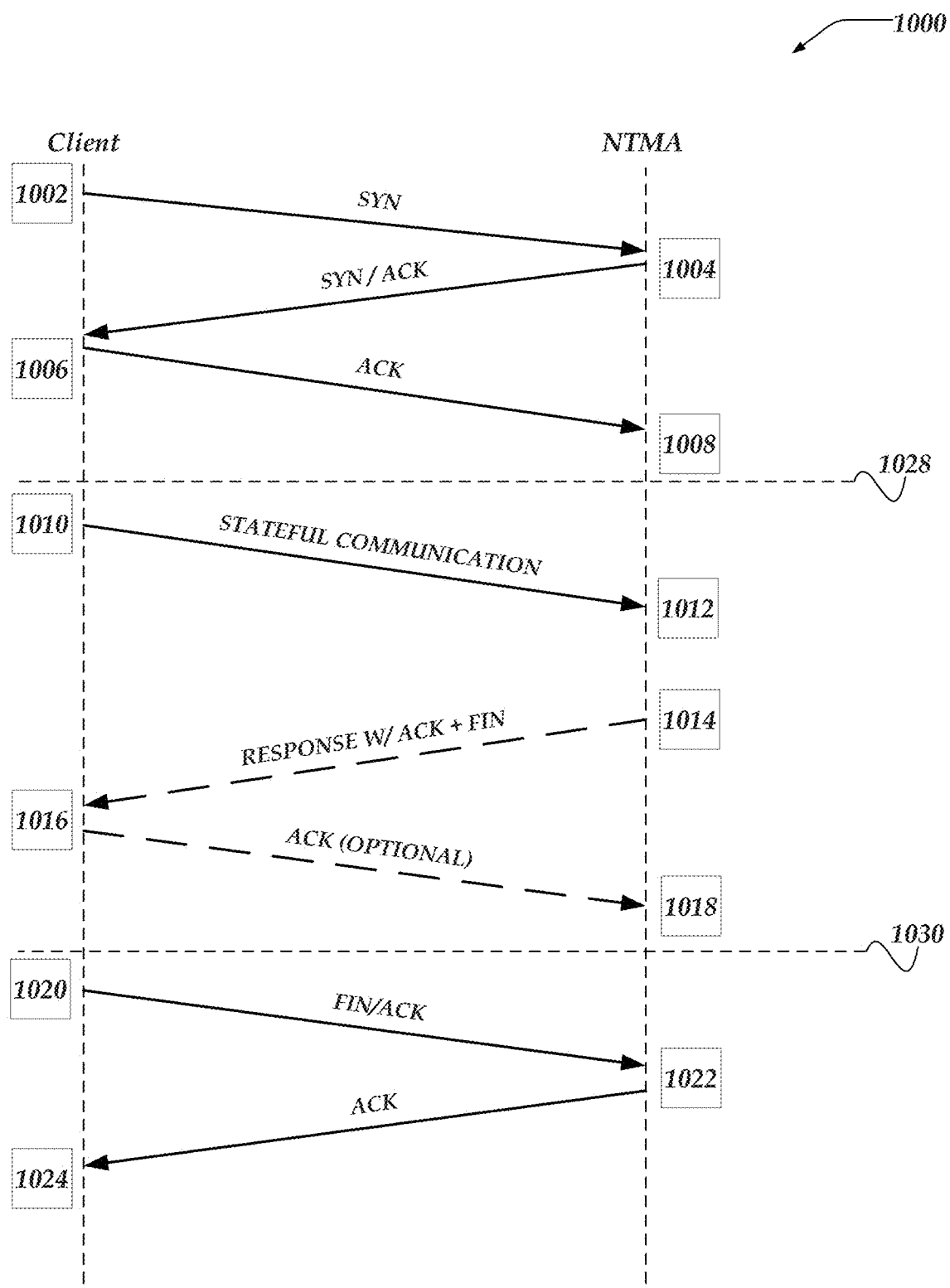
FIG. 10 illustrates a logical sequence diagram that represents a sequence for stateless communication using a stateful protocol where the NTMA initiates close of the connection with its response in accordance with one or more of the various embodiments.

FIG. 10 illustrates a logical sequence diagram that represents sequence 1000 for stateless communication using a stateful protocol where the NTMA initiates close of the connection with its response in accordance with one or more of the various embodiments. Similar to sequence 500 above sequence 1000 shows a sequence of communication transactions between a client and a NTMA. Accordingly, for brevity steps 1002-1012 may be considered the same as steps 502-512. Likewise, for brevity, in the descriptions for the remaining steps one or more actions may be omitted since they are fully described in sequence 500.

At step 1014, in one or more of the various embodiments, the NTMA may obtain the packet data and provide a response to the client. For example, when employing TCP, the NTMA may include a response SEQ number generated from the request's ACK number and the response's ACK number may be generated by summing the request's SEQ number and the length of the request. And, in some cases, if TH FIN flag is sent with the request, the request's ACK number may also incremented by one.

In one or more of the various embodiments, the NTMA may be arranged to include a termination message in the response to enable the client to close its side of the connection. This enables the NTMA to support application protocols that require a server to send a termination messages with its response. For example, when employing TCP, the NTMA may be arranged to send a FIN message the follows the response (e.g., Response w/ ACK+FIN).

At step 1016, in one or more of the various embodiments, the client may obtain the response and has the option to provide an acknowledgement message. In some of the various embodiments, the client may modify one or more values included in the response and may include the one or more modified values in the acknowledgement message. For example, when employing TCP, the client may include the client SEQ number. In this example, the client may increment the NTMA SEQ number by a length of the packet data in the response and may include the NTMA SEQ number as an ACK number. Also, in some embodiments, the client may close its connection in response to receiving the FIN from the NTMA.

At step 1018, in one or more of the various embodiments, the NTMA may obtain the acknowledgement message and perform as described for step 518.

At step 1020, in one or more of the various embodiments, the client may provide a connection termination message that includes a final acknowledgement message. For example, when employing TCP, the client may send a FIN/ACK packet to the NTMA.

At step 1022, in one or more of the various embodiments, the NTMA may obtain the connection termination message and may provide a final acknowledgement message to the client. For example, when employing TCP, the NTMA may include the obtained client SEQ number as an ACK number and may include the obtained ACK number as the TCM SEQ number in a ACK packet.

At step 1024, the client may obtain the final acknowledgement message and terminate its stateful connection. Note, since the NTMA is not maintaining state related to this stateful connection with the client, it does not have a connection to close.

What is claimed as new and desired to be protected by Letters Patent of the United States is:

1. A method for stateless communication using a stateful protocol implemented by a network traffic management system that comprises one or more network traffic management apparatuses (NTMAs) that execute instructions to perform the actions of the method, comprising:
  employing the stateful protocol to establish a connection between a client computer and the one or more NTMAs;
  discarding state information for the connection from the one or more NTMAs;
  generating verification information based on a portion of the network packet that an endpoint generates during initiation of a connection with another endpoint and candidate information based on another portion of the network packet that refers to connection information that the endpoint extracts or generates from a characteristic of the network packet;
  in response to using the stateful protocol to receive a network packet, validating the network packet based on a comparison of the verification information for the portion of the network packet and the candidate validation information for the other portion of the network packet; and providing a reply to the client computer based on the validated network packet, wherein the reply adheres to the stateful protocol.

2. The method of claim 1, wherein the state information, further comprises other information associated with the connection and one or more handshake packets exchanged between the one or more NTMAs and the client computer.

3. The method of claim 1, further comprising:
exchanging one or more handshake packets between the client computer and the one or more NTMAs, wherein the validated network packet includes validation information from the one or more handshake packets exchanged by the one or more NTMAs with the client computer.

4. The method of claim 1, wherein discarding state information for the connection, further comprises employing the one or more NTMAs to de-establish the connection to the client computer.

5. The method of claim 1, wherein validating the network packet, further comprises employing one or more values of the network packet for validation.

6. The method of claim 1, wherein validating the network packet, further comprises:
in response to the network packet provided by the client computer being arranged as a data packet, enabling validation of the network packet; and
in response to the network provided by the client computer being unarranged as the data packet, non-enabling validation of the network packet.

7. The method of claim 1, wherein the validation information provided by the one or more NTMAs, further comprises, a SYN cookie that is in accordance with TCP.

8. A network traffic management apparatus (NTMA) that uses a stateful protocol to perform stateless communication with a client computer, further comprising:
a memory that includes instructions;
one or more processors that execute the instructions to perform actions, including:
employing the stateful protocol to establish a connection between the client computer and the NTMA;
discarding state information for the connection from the NTMA;
generating verification information based on a portion of the network packet that an endpoint generates during initiation of a connection with another endpoint and candidate information based on another portion of the network packet that refers to connection information that the endpoint extracts or generates from a characteristic of the network packet;
in response to using the stateful protocol to receive a network packet, validating the network packet based on a comparison of the verification information for the portion of the network packet and the candidate validation information for the other portion of the network packet; and
providing a reply to the client computer based on the validated network packet, wherein the reply adheres to the stateful protocol.

9. The NTMA of claim 8, wherein the state information, further comprises other information associated with the connection and one or more handshake packets exchanged between the one or more NTMAs and the client computer.

10. The NTMA of claim 8, further comprising:
exchanging one or more handshake packets between the client computer and the one or more NTMAs, wherein the validated network packet includes validation information from the one or more handshake packets exchanged by the one or more NTMAs with the client computer.

11. The NTMA of claim 8, wherein discarding state information for the connection, further comprises employing the NTMA to de-establish the connection to the client computer.

12. The NTMA of claim 8, wherein validating the network packet, further comprises employing one or more values of the network packet for validation.

13. The NTMA of claim 8, wherein validating the network packet, further comprises:
in response to the network packet provided by the client computer being arranged as a data packet, enabling validation of the network packet; and
in response to the network provided by the client computer being unarranged as the data packet, non-enabling validation of the network packet.

14. The NTMA of claim 8, wherein the validation information provided by the one or more NTMAs, further comprises, a SYN cookie that is in accordance with TCP.

15. A processor readable non-transitory storage media that includes instructions for stateless communication using a stateful protocol, wherein execution of the instructions by one or more hardware processors of one or more network traffic management apparatuses (NTMAs) perform actions, comprising:
employing the stateful protocol to establish a connection between the client computer and the NTMA;
discarding state information for the connection from the NTMA;
generating verification information based on a portion of the network packet that an endpoint generates during initiation of a connection with another endpoint and candidate information based on another portion of the network packet that refers to connection information that the endpoint extracts or generates from a characteristic of the network packet;
in response to using the stateful protocol to receive a network packet, validating the network packet based on a comparison of the verification information for the portion of the network packet and the candidate validation information for the other portion of the network packet; and
providing a reply to the client computer based on the validated network packet, wherein the reply adheres to the stateful protocol.

16. The processor readable non-transitory storage media of claim 15, further comprising:
exchanging one or more handshake packets between the client computer and the one or more NTMAs, wherein the validated network packet includes validation information from the one or more handshake packets exchanged by the one or more NTMAs with the client computer.

17. The processor readable non-transitory storage media of claim 15, wherein discarding state information for the connection, further comprises employing the NTMA to de-establish the connection to the client computer.

18. The processor readable non-transitory storage media of claim 15, wherein validating the network packet, further comprises employing one or more values of the network packet for validation.

19. The processor readable non-transitory storage media of claim 15, wherein validating the network packet, further comprises:

in response to the network packet provided by the client computer being arranged as a data packet, enabling validation of the network packet; and in response to the network provided by the client computer being unarranged as the data packet, non-enabling validation of the network packet.

20. The processor readable non-transitory storage media of claim 15, wherein the validation information provided by the one or more NTMAs, further comprises, a SYN cookie that is in accordance with TCP.

* * * * *